(12) United States Patent
Tokunaka et al.

(10) Patent No.: US 8,149,660 B2
(45) Date of Patent: Apr. 3, 2012

(54) DRIVE APPARATUS, METHOD OF INFORMING POSSIBILITY OF HANDLING AND OPERATING RECORDING MEDIUM, CONTROL METHOD OF HANDLING AND OPERATING RECORDING MEDIUM, AND RECORDING MEDIUM

(75) Inventors: Junzo Tokunaka, Kanagawa (JP); Mitsutoshi Shinkai, Kanagawa (JP)

(73) Assignee: Sony Corporation (JP)

( * ) Notice: Subject to any disclaimer, the term of this patent is extended or adjusted under 35 U.S.C. 154(b) by 76 days.

(21) Appl. No.: 12/009,966

(22) Filed: Jan. 23, 2008

(65) Prior Publication Data

US 2008/0180829 A1 Jul. 31, 2008

(30) Foreign Application Priority Data

Jan. 29, 2007 (JP) ................ P2007-017516

(51) Int. Cl.
*G11B 15/18* (2006.01)
(52) U.S. Cl. ..... 369/47.38; 360/69; 380/203; 340/572.1
(58) Field of Classification Search .......... 360/69; 369/275.3, 275.4, 273, 47.38; 340/572.1, 340/572.7, 10.1, 10.4; 380/203; 720/630
See application file for complete search history.

(56) References Cited

U.S. PATENT DOCUMENTS

| | | | |
|---|---|---|---|
| 6,480,100 B1* | 11/2002 | Frieden et al. ......... | 340/10.1 |
| 6,714,509 B2* | 3/2004 | Kumagai et al. ....... | 369/275.4 |
| 6,778,944 B2* | 8/2004 | Kaneyama et al. ..... | 702/183 |
| 7,031,470 B1* | 4/2006 | Bar-On ................. | 380/203 |
| 2003/0028787 A1* | 2/2003 | Fayed et al. ........... | 713/189 |
| 2004/0052203 A1* | 3/2004 | Brollier ................ | 369/273 |
| 2004/0054594 A1* | 3/2004 | Forster et al. ......... | 705/18 |
| 2004/0120247 A1* | 6/2004 | Lee et al. .............. | 369/275.3 |
| 2005/0120260 A1* | 6/2005 | Suzuki et al. .......... | 714/5 |
| 2006/0112124 A1 | 5/2006 | Ando et al. | |
| 2006/0132309 A1* | 6/2006 | Posamentier .......... | 340/572.1 |
| 2006/0220870 A1* | 10/2006 | Kimura ................ | 340/572.7 |
| 2006/0230448 A1* | 10/2006 | Iwakawa et al. ....... | 726/17 |
| 2007/0067784 A1* | 3/2007 | Usami et al. .......... | 720/630 |
| 2007/0176750 A1* | 8/2007 | Sakai et al. ........... | 340/10.4 |
| 2008/0136599 A1* | 6/2008 | Sugano et al. ......... | 340/10.1 |

FOREIGN PATENT DOCUMENTS

JP 62057167 A 3/1987

(Continued)

OTHER PUBLICATIONS

Office Action from Japanese Application No. 2007-017516, dated Feb. 8, 2011.

(Continued)

*Primary Examiner* — Ali Neyzari
(74) *Attorney, Agent, or Firm* — Lerner, David, Littenberg, Krumholz & Mentlik, LLP

(57) ABSTRACT

A drive apparatus that handles and operates a recording medium attached with a memory tag, the drive apparatus include: a recording medium mounting part on which the recording medium is mounted; an information readout part configured to read information out of a memory tag attached to a recording medium before the recording medium is mounted on the recording medium mounting part; a determining part configured to determine whether the recording medium can be handled and operated based on the information read out by the information readout part; and an informing part configured to inform a determined result determined by the determining part.

13 Claims, 15 Drawing Sheets

FOREIGN PATENT DOCUMENTS

| | | |
|---|---|---|
| JP | 62157391 A | 7/1987 |
| JP | 63167471 A | 7/1988 |
| JP | 03073481 A | 3/1991 |
| JP | 05258520 A | 10/1993 |
| JP | 06208777 A | 7/1994 |
| JP | 09-237485 | 9/1997 |
| JP | 10021636 A | 1/1998 |
| JP | 10172261 A | 6/1998 |
| JP | 10172263 A | 6/1998 |
| JP | 10177776 A | 6/1998 |
| JP | 10199066 A | 7/1998 |
| JP | 10269744 A | 10/1998 |
| JP | 10308088 A | 11/1998 |
| JP | 11120679 A | 4/1999 |
| JP | 11203832 A | 7/1999 |
| JP | 11203847 A | 7/1999 |
| JP | 2000057736 A | 2/2000 |
| JP | 2000-113126 A | 4/2000 |
| JP | 2002-025228 A | 1/2002 |
| JP | 2002025149 A | 1/2002 |
| JP | 2002025224 A | 1/2002 |
| JP | 2002025225 A | 1/2002 |
| JP | 2002025226 A | 1/2002 |
| JP | 2002025227 A | 1/2002 |
| JP | 2002025229 A | 1/2002 |
| JP | 2002025230 A | 1/2002 |
| JP | 2002025232 A | 1/2002 |
| JP | 2002027382 A | 1/2002 |
| JP | 2002050093 A | 2/2002 |
| JP | 2002320184 A | 10/2002 |
| JP | 2003006963 A | 1/2003 |
| JP | 2004014045 A | 1/2004 |
| JP | 2004213793 A | 7/2004 |
| JP | 2005004856 A | 1/2005 |
| JP | 2005108271 A | 4/2005 |
| JP | 2005209240 A | 8/2005 |
| JP | 2005317374 A | 11/2005 |
| JP | 2006031843 A | 2/2006 |
| JP | 2006-154955 A | 6/2006 |
| JP | 2006344329 A | 12/2006 |

OTHER PUBLICATIONS

Office Action from Japanese Application No. 2007-017516, dated May 10, 2011.

* cited by examiner

FIG. 14

| OPERATION LEVEL 1 | CRCC 1 CHECK | ○ | ○ | × | × |
|---|---|---|---|---|---|
| OPERATION LEVEL 2 | CRCC2 CHECK | ○ | × | ○ | × |
| | DETERMINED RESULT | (A) | (B) | (C) | (D) |

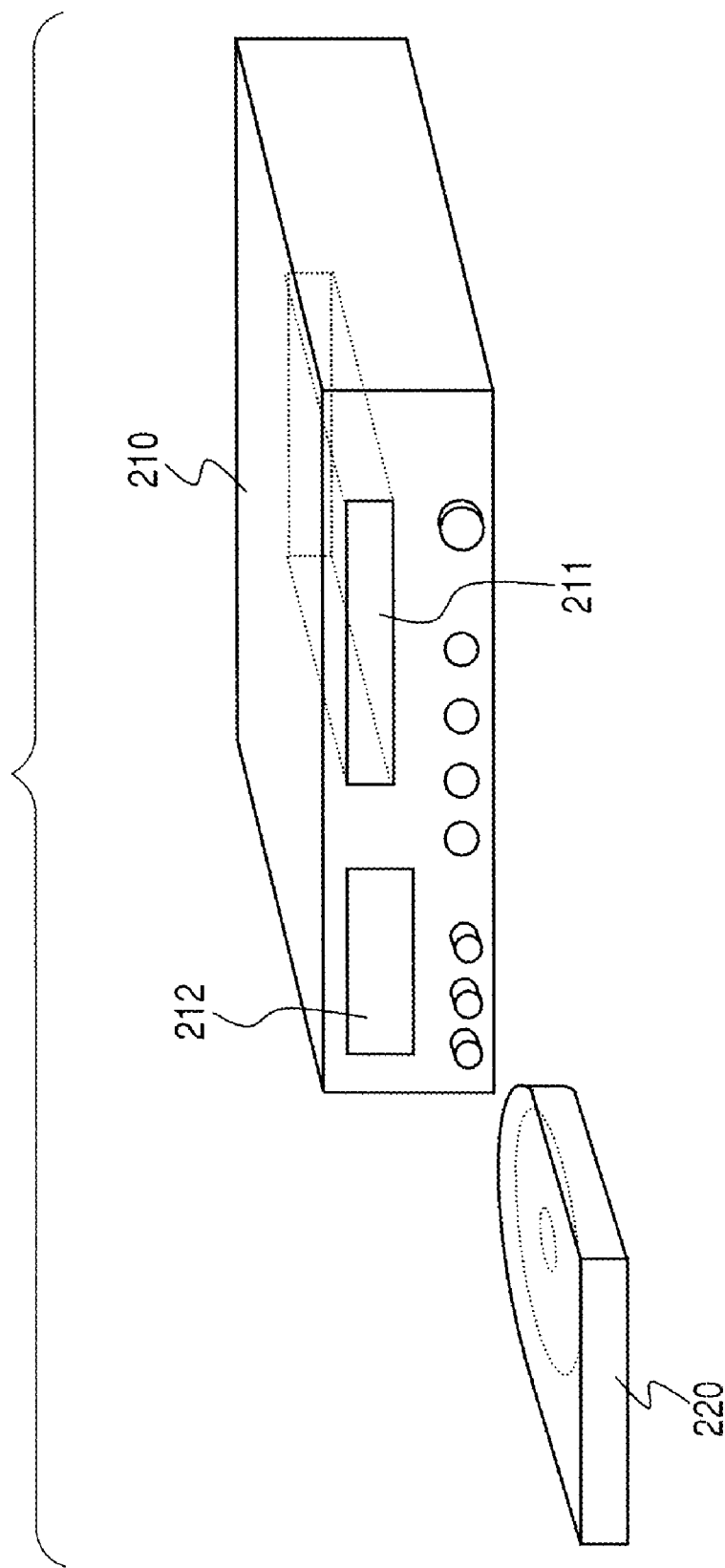

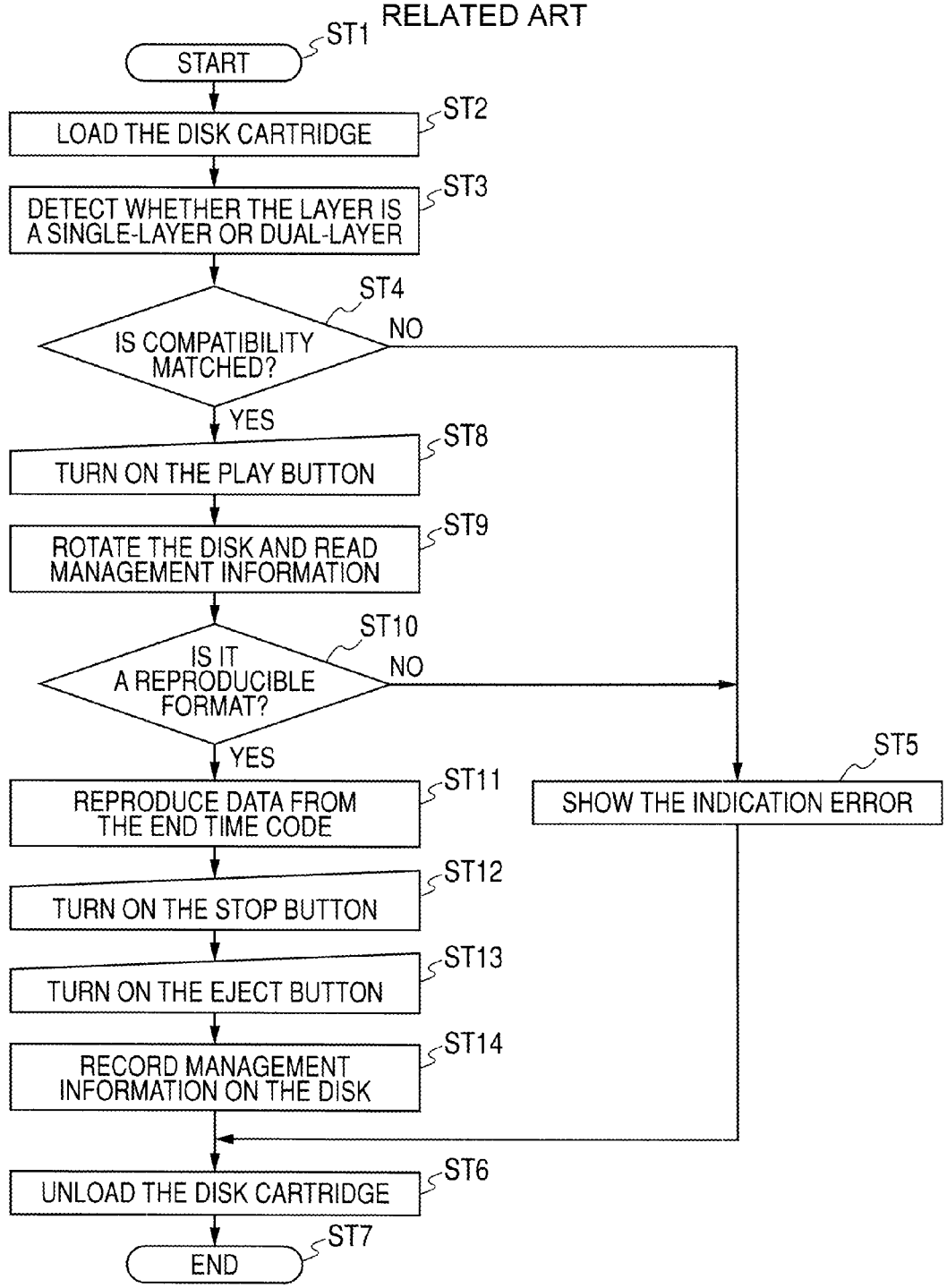

DRIVE APPARATUS, METHOD OF INFORMING POSSIBILITY OF HANDLING AND OPERATING RECORDING MEDIUM, CONTROL METHOD OF HANDLING AND OPERATING RECORDING MEDIUM, AND RECORDING MEDIUM

CROSS REFERENCES CROSS-REFERENCE TO RELATED APPLICATIONS

The present application claims priority from Japanese Patent Application No. JP 2007-017516 filed in the Japanese Patent Office on Jan. 29, 2007, the entire content of which is incorporated herein by reference.

BACKGROUND OF THE INVENTION

1. Field of the Invention

The present invention relates to a drive apparatus, a method of informing a possibility of handling and operating a recording medium, a control method of handling and operating a recording medium, and a recording medium. More specifically, the invention relates to a drive apparatus in which the possibility of handling and operating a recording medium is determined and informed based on information read out of a memory tag attached to the recording medium via wireless communications, whereby it is intended to shorten operator's manipulation time. In addition, the invention relates to a drive apparatus in which the handling and operation of a recording medium is controlled based on information read out of a memory tag attached to the recording medium via wireless communications, whereby a time period is shortened from an operator turning on a play button to the start of reproduction.

2. Description of the Related Art

Heretofore, in the case of cassette tape media, the recording format of a cassette tape is detected from the position of a hole on the cassette. In this case, in the case in which a cassette tape is loaded into an apparatus main body and the compatibility is not matched, the cassette tape is immediately unloaded.

However, in a disk system using an optical disk medium (XDCAM: trademark of Sony Corporation), a hole is provided on a disk cartridge other than a reference hole, but these holes are currently all closed. In other words, in the disk cartridge, holes are not defined to every recording format as a tape cassette does. Currently, only a single-layer disk cartridge (PROFESSIONAL DISC: trademark of Sony Corporation) having a single recording layer is commercially available. In order to confirm the compatibility of a disk cartridge, it is necessary to load this disk cartridge into an apparatus main body to read information about the recording format out of its optical disk.

FIG. 15 schematically shows an optical disk apparatus 210 and a disk cartridge 220 before. In confirming the compatibility of a disk cartridge 220, an operator inserts the disk cartridge 220 into an insertion port 211 of the optical disk apparatus 210, and loads the disk cartridge 220 (see FIGS. 16A and 16B). In the state in which the disk cartridge 220 is loaded, the optical disk apparatus 210 rotates an optical disk in the disk cartridge 220 to read information about the recording format, and determines the compatibility of the disk cartridge. Then, when the optical disk apparatus 210 determines that the optical disk apparatus 210 does not support the recording format indicated by information about the recording format and the compatibility is not matched, the optical disk apparatus 210 unloads the disk cartridge 220 (see FIG. 16C), and shows error on a display part 212.

In addition, FIG. 17 shows a flow chart depicting an exemplary process in the case in which data in the recorded disk cartridge 220 is reproduced in the optical disk apparatus 210 before.

In Step ST1, the optical disk apparatus 210 starts the process, and then goes to Step ST2. In Step ST2, the optical disk apparatus 210 loads the disk cartridge 220 inserted into the insertion port 211. Then, in Step ST3, the optical disk apparatus 210 detects whether the recording layer is a single layer or two layers based on a hole in the disk cartridge 220.

Subsequently, in Step ST4, the optical disk apparatus 210 determines whether compatibility is matched with the disk cartridge 220 based on the detected result in Step ST3. For example, if the disk cartridge 220 has a single-layer disk and the apparatus 210 can handle and operate the single-layer disk, or if the disk cartridge 220 has a dual-layer disk and the apparatus 210 can handle and operate the dual-layer disk, the optical disk apparatus 210 determines that the compatibility is matched.

If the optical disk apparatus 210 determines that the compatibility is not matched in Step ST4, the optical disk apparatus 210 goes to Step ST5. In Step ST5, the optical disk apparatus 210 shows error on the display part 212, and after that, goes to Step ST6. In Step ST6, the optical disk apparatus 210 unloads the disk cartridge 220, and after that, in Step ST7, the optical disk apparatus 210 ends the process.

In addition, if the optical disk apparatus 210 determines that the compatibility is matched in Step ST4, an operator turns on a play button in Step ST8, and then the optical disk apparatus 210 goes to Step ST9. In Step ST9, the optical disk apparatus 210 rotates the optical disk, and reads and analyzes management information. Then, in Step ST10, the optical disk apparatus 210 determines whether the recording format is a reproducible format based on information about the recording format included in the management information read in Step ST9.

If the optical disk apparatus 210 determines that the format is not reproducible in Step ST10, in Step ST5, the optical disk apparatus 210 shows error on the display part 212. In Step ST6, the optical disk apparatus 210 unloads the disk cartridge, and after that, in Step ST7, the optical disk apparatus 210 ends the process.

If the optical disk apparatus 210 determines that the format is reproducible in Step ST10, the optical disk apparatus 210 goes to Step ST11. In Step ST11, the optical disk apparatus 210 reproduces data from an end time code based on time code (end time code) information about the last reproduction position included in the management information read in Step ST9. Then, the operator turns on a stop button in Step ST12, the operator turns on the eject button in Step ST13, and then the optical disk apparatus 210 goes to Step ST14.

In Step ST14, the optical disk apparatus 210 rewrites management information with the updated end time code to the optical disk, unloads the disk cartridge in Step ST6, and after that, in Step ST7, ends the process.

For example, JP-A-2006-154955 describes an apparatus in which a memory tag is mounted on an optical disk, information written in the memory tag is read when the optical disk is mounted in an optical disk apparatus, and it is determined whether the operation of the optical disk apparatus itself is restricted, or how much the accessible range of the optical disk is allowed for an operator (user) based on the read information.

SUMMARY OF THE INVENTION

As described above, in order to confirm the compatibility of the disk cartridge, it is necessary to the optical disk apparatus 210 before to load the disk cartridge into the apparatus main body to read information about the recording format out of its optical disk, which causes a problem that operator's manipulation time is prolonged. In addition, in reproducing data in the recorded disk cartridge, in the optical disk apparatus 210 before, an operator turns on the play button to rotate the optical disk for reading and analyzing management information, and then data is reproduced from the acquired time code (the end time code) at the end position of reproduced data, which leads to a problem of prolonging a time period from the operator turning on the play button to the start of reproducing data.

In addition, the publication describes a technique in which information written in the memory tag attached to an optical disk is read for use. However, the publication does not disclose a technique of the determination of compatibility using the information.

It is desirable to intend to shorten operator's manipulation time. In addition, it is also desirable to shorten a time period from an operator turning on a play button to the start of reproducing data.

A drive apparatus according to an embodiment of the invention is a drive apparatus that handles and operates a recording medium attached with a memory tag, the drive apparatus including: a recording medium mounting part on which the recording medium is mounted; an information readout part configured to read information out of a memory tag attached to a recording medium before the recording medium is mounted on the recording medium mounting part; a determining part configured to determine whether the recording medium can be handled and operated based on the information read out by the information readout part; and an informing part configured to inform a determined result determined by the determining part.

In accordance with the embodiment of the invention, the drive apparatus handles and operates a recording medium attached with a memory tag. The recording medium is a medium such as an optical disk, a magnetic disk, and a semiconductor memory. In the drive apparatus, the recording medium is mounted on the recording medium mounting part, and in this state, data can be reproduced from the recording medium, or data can be recorded on the recording medium.

The information readout part reads information out of the memory tag attached to the recording medium. In this case, before the recording medium is mounted on the recording medium mounting part, the information readout part communicates with the memory tag to read information out of the memory tag via wireless communications.

Based on the information read out of the memory tag, the determining part determines whether the recording medium can be handled and operated, that is, the determining part determines compatibility. For example, the information for use in this determination is information indicating the disk type such as a single-layer disk, a dual-layer disk, a Blu-ray disk and a disk cartridge, and information about the recording format such as SD formats and HD formats.

The determined result of the possibility of handling and operating the recording medium is informed. For example, the determined result is shown on the display part arranged on the panel surface of the drive apparatus. In addition, for example, the determined result is outputted from a speaker with sounds. As described above, before the recording medium is mounted on the recording medium mounting part, that is, before the recording medium is loaded, an operator is informed of the possibility of handling and operating the recording medium. Thus, the operator can avoid waste manipulations such as mounting a recording medium difficult to be handled and operated in the drive apparatus on the drive apparatus, and it can be intended to shorten manipulation time.

In accordance with the embodiment of the invention, for example, an IC tag attached to a recording medium is recorded with information formed in a hierarchy for each item of information for use at each of operation levels as corresponding to a plurality of operation levels, and the determining part may determine whether the recording medium can be handled and operated based on hierarchy information at an operation level to permit determination, the hierarchy information being read out by the information readout part. In this case, the determining part does not use error information as information for determination, and wrong determination can be prevented.

In addition, a drive apparatus according to an embodiment of the invention is a drive apparatus that handles and operates a recording medium attached with a memory tag, the drive apparatus including: a recording medium mounting part on which the recording medium is mounted; an information readout part configured to read information out of a memory tag attached to a recording medium before the recording medium is mounted on the recording medium mounting part; and a control part configured to control the handling and operation of the recording medium mounted on the recording medium mounting part based on the information read out by the information readout part.

In accordance with the embodiment of the invention, the drive apparatus handles and operates a recording medium attached with a memory tag. The recording medium is an optical disk, a magnetic disk, and a semiconductor memory, for example. In the drive apparatus, data can be reproduced from the recording medium, or data can be recorded on the recording medium in the state in which the recording medium is mounted on the recording medium mounting part.

The information readout part reads information out of the memory tag attached to the recording medium. In this case, before the recording medium is mounted on the recording medium mounting part, the information readout part communicates with the memory tag to read information out of the memory tag via wireless communications.

Based on the information read out of the memory tag, the control part controls the handling and operation of the recording medium mounted on the recording medium mounting part. For example, information read out by the information readout part is time code information indicating an end position of reproduced data, and the control part controls a position of reproducing data on the recording medium to a position indicated by the time code information based on the time code information. In this case, a time period from an operator turning on a play button to the start of reproducing data can be shortened.

In accordance with the embodiment of the invention, for example, the memory tag attached to the recording medium is recorded with information formed in a hierarchy for each item of information for use at each of operation levels as corresponding to a plurality of operation levels, and the control part may control the handling and operation of the recording medium based on hierarchy information at an operation level to permit controlling the handling and operation of the recording medium, the hierarchy information being read out by the information readout part. In this case, the control part does not use error information as control information, and wrong control can be prevented.

BRIEF DESCRIPTION OF THE DRAWINGS

FIG. 14 shows a diagram depicting the categories of the determination of permission at operation levels 1 and 2 done in the control determining part of the reader/writer;

FIG. 15 shows a perspective view schematically depicting an optical disk apparatus and a disk cartridge before;

FIG. 17 shows a flow chart illustrative of an exemplary process of reproducing data in a recorded disk cartridge in the related art.

DETAILED DESCRIPTION OF THE INVENTION

Figure 1:
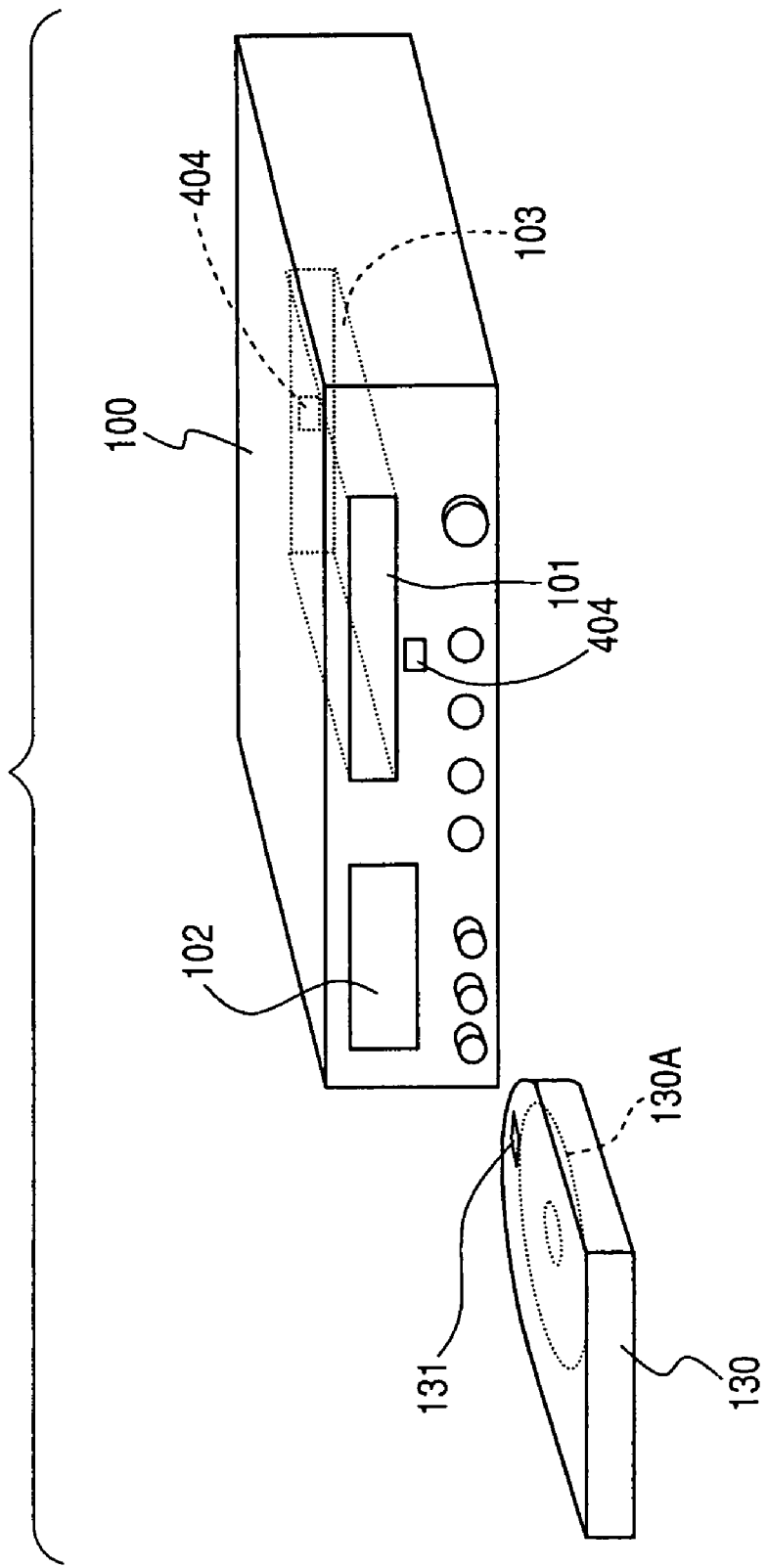
FIG. 1 shows a perspective view schematically depicting an optical disk apparatus and a disk cartridge according to an embodiment.

Hereinafter, an embodiment of the invention will be described with reference to the drawings. FIG. 1 schematically shows an optical disk apparatus 100 and a disk cartridge 130 according to an embodiment of the invention. Inside the disk cartridge 130, an optical disk 130A is arranged. An operator inserts the disk cartridge 130 into an insertion port 101 of the optical disk apparatus 100, and then the disk cartridge 130 is loaded there inside and mounted on a recording medium mounting part 103 inside the optical disk apparatus 100. As described above, the disk cartridge 130 is mounted on the recording medium mounting part 103, and in this state, data can be reproduced from the optical disk 130A in the disk cartridge 130, or data can be recorded on the optical disk 130A.

In the embodiment, the disk cartridge 130 is attached with a memory tag (IC tag) 131. In this case, the memory tag 131 is bonded to or buried in the case of the disk cartridge 130 for mounting. The memory tag 131 is written with general information for identifying the disk cartridge 130 such as a disk title, a disk ID, a creation date, and a remaining time, and information about contents recorded in the disk cartridge 130 (such as a title, a record date, a thumbnail image, and audio data).

In addition, the memory tag 131 is written with information whether the disk cartridge 130 can be handled and operated in the optical disk apparatus 100, that is, information that determines compatibility. For example, information for determining compatibility is information indicating the disk type such as a single-layer disk, a dual-layer disk, a Blu-ray disk and a disk cartridge, and information about the recording format such as SD formats and HD formats.

In addition, the memory tag 131 is written with information for controlling the handling and operation of the disk cartridge 130 mounted on the optical disk apparatus 100. For example, information for controlling the handling and operation the disk cartridge 130 is information about a time code (end time code) indicating the end position of reproduced data and an edit list (EDL: Edit Decision List). The end time code is used for controlling the reproduction operation of the disk cartridge 130. The edit list is used for controlling the edit operation of the disk cartridge 130. For example, such an application can be considered that materials included in the edit list are used in priority for automatic editing.

Although not shown in FIG. 1, the optical disk apparatus 100 has a reader/writer that reads information out of the memory tag 131 of the optical disk cartridge 130, or writes information on the memory tag 131. The reader/writer configures an information readout part. The reader/writer communicates with the memory tag 131 to read and write information via wireless communications. Antennas 404 of the reader/writer are arranged near the insertion port 101 of the optical disk apparatus 100 and at the deepest part of the recording medium mounting part 103.

Figure 2A:
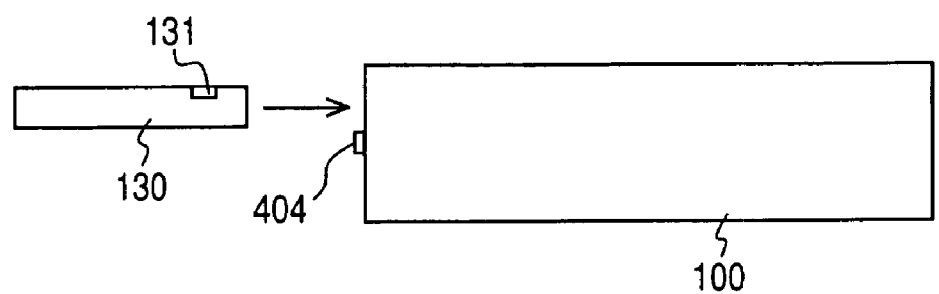
FIGS. 2A and 2B show a diagram illustrative of the operation of acquiring information from a memory tag attached to the disk cartridge.
Figure 2B:
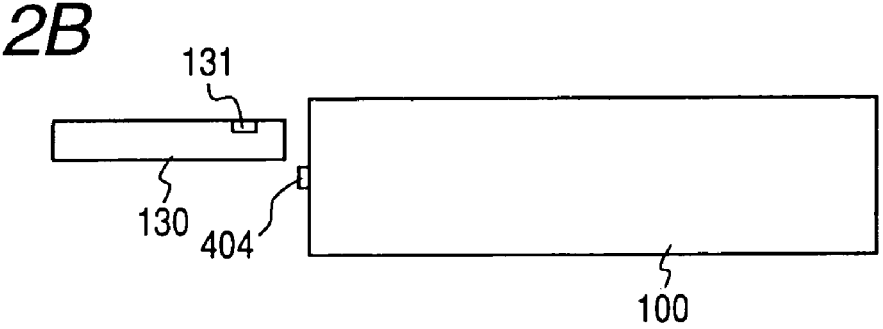

The antenna 404 is arranged near the insertion port 101, whereby the reader/writer can read information written on the memory tag 131 at the time when an operator brings the disk cartridge 130 close to the optical disk apparatus 100 (see FIG. 2A), and when the operator brings the position of the disk cartridge 130 to the position close to the insertion port (see FIG. 2B).

In addition, the antenna 404 is arranged at the deepest part of the recording medium mounting part 103, whereby the reader/writer can write information on the memory tag 131 in the state in which the disk cartridge 130 is mounted on the recording medium mounting part 103.

Figure 3:
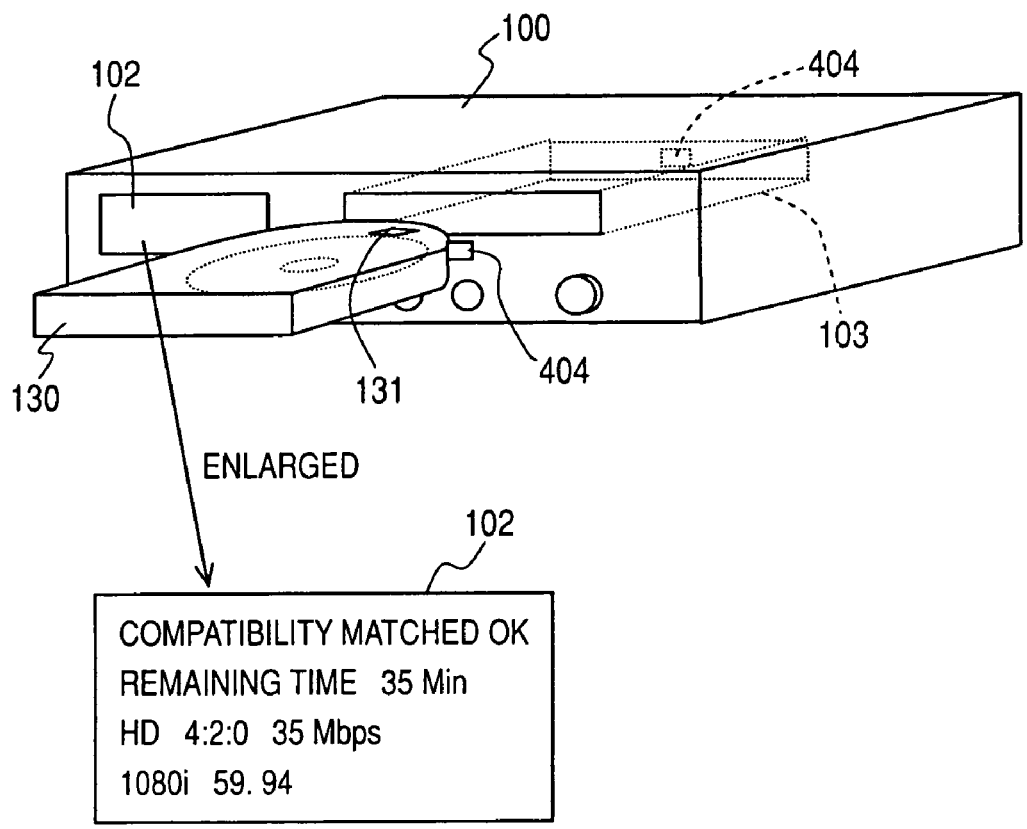
FIG. 3 shows a diagram depicting an exemplary determined result of compatibility shown on a display part.

As described above, based on information read out of the memory tag 131 in the state in which the disk cartridge 130 is positioned close to the insertion port 101, the optical disk apparatus 100 determines whether the disk cartridge 130 can be handled and operated in the optical disk apparatus 100, that is, the optical disk apparatus 100 determines compatibility, and shows the determined result on the display part 102. The compatibility is determined by a system control part that configures a determining part. In addition, the display part 102 configures an informing part. Moreover, on the display part 102, information about a disk title, a recording format, and a remaining time may be shown together with the determined result of compatibility. FIG. 3 shows an exemplary representation on the display part 102 in which the recording format and the remaining time are shown in addition to the determined result of compatibility. Furthermore, the determined result of compatibility may be informed by sound output through a speaker, not shown, instead of showing the result on the display part 102 as described above.

Figure 4:
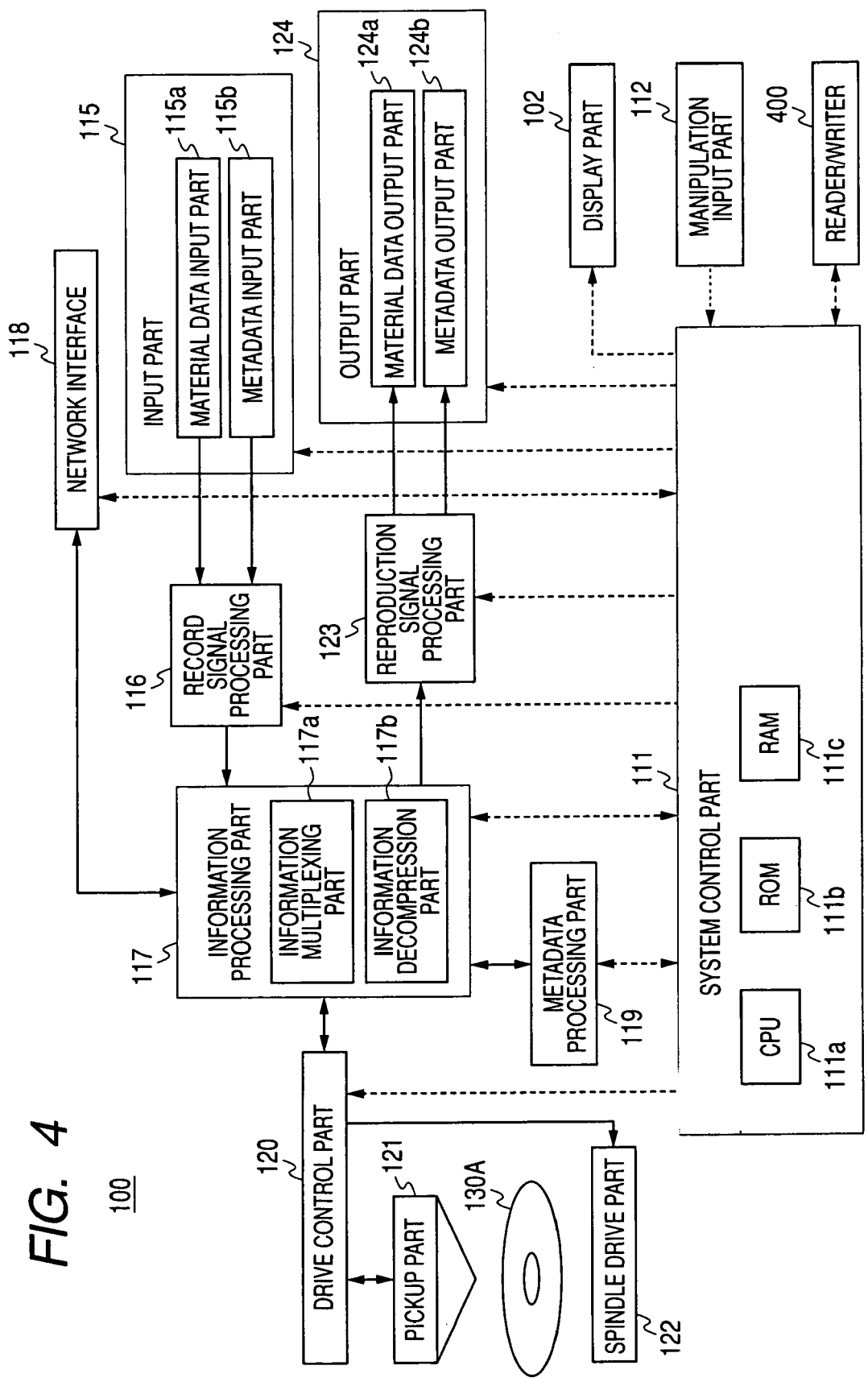
FIG. 4 shows a block diagram depicting an exemplary configuration of the optical disk apparatus.

FIG. 4 shows an exemplary configuration of the optical disk apparatus 100.

The optical disk apparatus 100 has a system control part 111, a manipulation input part 112, a reader/writer 400, the display part 102, an input part 115, a record signal processing part 116, the information processing part 117, a network interface 118, a metadata processing part 119, a drive control part 120, a pickup part 121, a spindle drive part 122, a reproduction signal processing part 123, and an output part 124.

The system control part 111 is a control part that controls the overall optical disk apparatus 100 as depicted by dotted arrows. The system control part 111 has a CPU (Central Processing Unit) 111*a*, a ROM (Read Only Memory) 111*b*, and a RAM (Random Access Memory) 111*c*.

The CPU 111*a* functions as a controller that controls the operations of the individual parts. The ROM 111*b* stores therein a control program to control the operation of the CPU 111*a*. The RAM 111*c* functions as a work area for the CPU 111*a*. The CPU 111*a* reads the control program stored in the ROM 111*b*, as necessary, forwards the read control program to the RAM 111*c* and decompresses it therein to read and run the decompressed control program, and then controls the operations of the individual parts.

For example, the manipulation input part 112 is configured of an input device such as a keyboard and buttons, which accepts a manipulation input from an operator (user), and supplies information about the input to the system control part 111. As described above, the reader/writer 400 communicates with the memory tag 131 on the disk cartridge 130 to read information out of the memory tag 131, or to write information to the memory tag 131 via wireless communications. Specific exemplary configurations of the reader/writer 400 and the memory tag 131 will be described later. For example, the display part 102 is configured of a display device such as an LCD (Liquid Crystal Display). As described above, on the display part 102, the operating state of the optical disk apparatus 100 and the manipulation state through the manipulation input part 112 by an operator are also shown in addition to the determined result of compatibility.

The input part 115 is a processing part that accepts information about contents supplied from the external devices of the optical disk apparatus 100, having a material data input part 115*a* that accepts material data (such as image data and audio data) externally supplied, and a metadata input part 115*b* that accepts metadata (such as real time metadata and non-real time metadata) externally supplied. The material data input part 115*a* supplies inputted material data to the record signal processing part 116, and the metadata input part 115*b* supplies inputted metadata to the record signal processing part 116.

The record signal processing part 116 applies signal processing to material data and metadata supplied from the input part 115 for processing such as conversion of the format of each item of data from the transmission format into the recording format. The record signal processing part 116 supplies data subjected to signal processing to the information processing part 117.

The information processing part 117 edits material data under the control done by the system control part 111. For example, the information processing part 117 has an information multiplexing part 117*a* that multiplexes a plurality of items of data, and an information decompression part 117*b* that decompresses a single item of information into a plurality of items of information, which performs synchronization and splitting processes. Material data and metadata as a target for editing are supplied from the record signal processing part 116, the network interface 118, or the drive control part 120. The information processing part 117 acquires material data and metadata supplied from the individual parts, edits the material data and metadata under control done by the system control part 111, and then supplies the edited material data and metadata to the network interface 118, the drive control part 120, or the reproduction signal processing part 123. Moreover, the metadata processing part 119 edits metadata.

Therefore, the information processing part 117 is supplied with metadata, and then provides the metadata to the metadata processing part 119.

For example, the network interface 118 is an interface that is connected to a LAN (Local Area Network) such as an Ethernet (trademark), or to the Internet. The network interface 118 communicates with a communication device such as a camera other than the optical disk apparatus 100 connected to the same network, whereby the network interface 118 acquires material data and metadata from other devices, and supplies the acquired material data and metadata to the information processing part 117. In addition, the network interface 118 supplies the material data and metadata supplied from the information processing part 117 to other devices through the network. Under the control done by the system control part 111, the metadata processing part 119 edits metadata supplied from the information processing part 117, and returns the edited metadata to the information processing part 117.

The drive control part 120 is a processing part that controls the individual parts of a drive of the optical disk apparatus 100, not shown, on which the optical disk 130A is mounted. For example, under the control done by the system control part 111, the drive control part 120 controls the pickup part 121 and the spindle drive part 122. The pickup part 121 reads information recorded on the optical disk 130A mounted on the drive, and writes information to the optical disk 130A. The spindle drive part 122 controls driving the optical disk 130A mounted to the drive.

Then, the drive control part 120 controls the pickup part 121 and the spindle drive part 122, and supplies data read out by the pickup part 121 to the information processing part 117. In addition, the drive control part 120 controls the pickup part 121 and the spindle drive part 122, and writes the data supplied from the information processing part 117 to the optical disk 130A through the pickup part 121.

Under the control done by the drive control part 120, the pickup part 121 applies laser light onto the optical disk 130A mounted to the drive to read data recorded on the optical disk 130A and supplies the data to the drive control part 120, or to write data supplied from the drive control part 120 to the optical disk 130A. At this time, under the control done by the drive control part 120, the pickup part 121 is slid in the radial direction of the optical disk 130A to control the access position to the optical disk 130A in the radial direction. The spindle drive part 122 mainly controls the rotational motion of the optical disk 130A mounted on the drive to control the pickup part 121 to make access to the access position of the optical disk 130A in the rotating direction.

The reproduction signal processing part 123 applies signal processing to the output signal (or the reproduction signal) supplied from the information processing part 117, for example, which converts the format of each item of data from the recording format into the transmission format. The reproduction signal processing part 123 supplies the data subjected to signal processing to the output part 124.

The output part 124 is a processing part that outputs information about contents to the external devices of the optical disk apparatus 100, having a material data output part 124*a* that externally outputs material data (such as image data and audio data) supplied from the reproduction signal processing part 123, and a metadata output part 124*b* that externally outputs metadata (such as real time metadata and non-real time metadata) supplied from the reproduction signal processing part 123. Moreover, the output part 124 has an output device such as a display and a speaker, which may output images and sounds configured of material data supplied from the reproduction signal processing part 123 through the output device.

Figure 5:
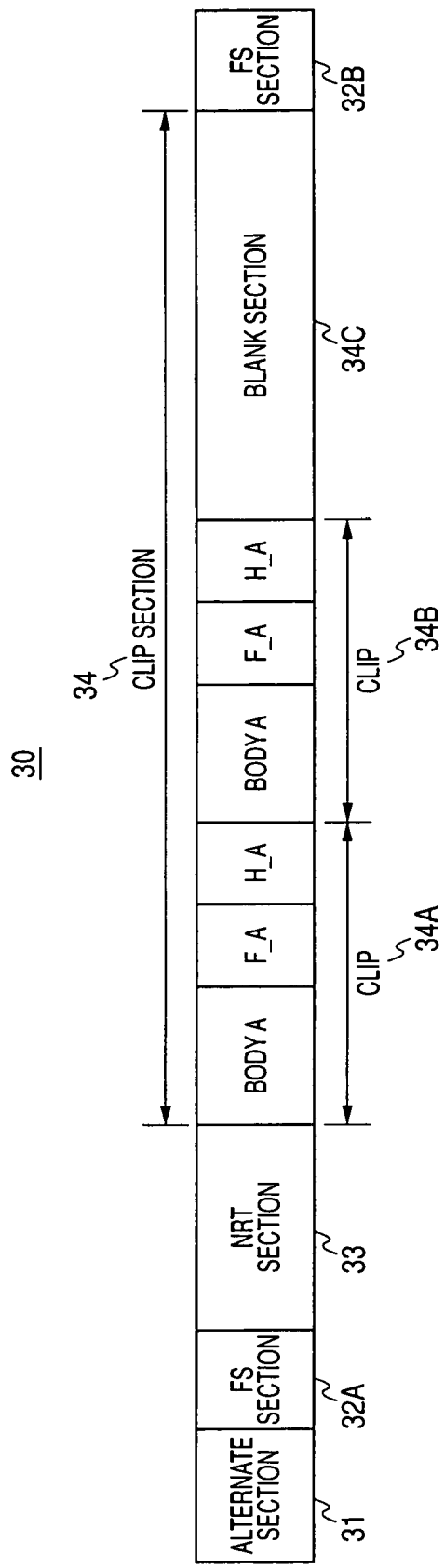
FIG. 5 shows a diagram depicting an exemplary configuration of the recording area of an optical disk.

FIG. 5 shows a schematic diagram depicting an exemplary configuration of a recording area 30 of the optical disk 130A.

The recording area 30 of the optical disk 130A has an alternate section 31, a file system sections (FS section) 32A and 32B, a non-real time (NRT) section 33, and a clip section 34. The alternate section 31 is an area that is used as an alternative area to a defective area for read and write in the case in which a defective area for read and write occurs due to scars, dirt, smear, defective work, or recording lifetime. The file system sections 32A and 32B are areas in which management information is recorded for managing data recorded in the NRT section 33 and the clip section 34 as files. The file system sections 32A and 32B configure a management information area.

The NRT section 33 is an area in which non-real time metadata (NRT metadata) is recorded that is metadata corresponding to the individual clips recorded in the clip section 34. The NRT section 33 configures a material information area. The clip section 34 is an area in which data of the individual clips is recorded. The term clip is a unit that indicates a single imaging process from the start to the end of imaging pictures by a photographer. The clip section 34 configures a data area.

For example, data of the individual clips is configured of real time metadata (RT metadata) formed of metadata corresponding to the individual frames of image data, audio data, and image data, and proxy data that is low resolution data of image data and audio data. Data of the individual clips (image data and audio data) configures material data that forms data streams of a predetermined content. Moreover, for example, in the case in which a plurality of items of image data is mixed by editing, a single item of image data as the edited result configures a single clip of data. For metadata attached to a clip of material data, there are real time metadata configured of data having the descriptions that call for real time processing in reading data, and non-real time metadata configured of data having the descriptions that do not call for real time processing in reading data.

For example, for real time metadata, the following are named: LTC (Linear Time Code) that uses information at a predetermined time such as hours, minutes and seconds for identifying the frame position of an image signal, FTC (File Time Code) that is the frame numbers of individual frames and is position information that is a relative position from the beginning frame of a file, a user bit (UB) that indicates the signal properties of the image signal of the frame, UMID (Unique Material Identifier) that is an ID for identifying the frame, information about GPS (Global Positioning System) that indicates the position at which pictures were taken by a video camera, an essence mark that is information about essence data such as image signals and audio signals, ARIB (Association of Radio Industries and Businesses) metadata, and setting/control information about a video camera that took pictures.

Moreover, ARIB metadata is metadata for communication interfaces such as SDI (Serial Digital Interface), which is standardized by the standard group ARIB. In addition, setting/control information about a video camera is information such as iris control values, white balance mode and black balance mode, and lens information about zooming and focusing of a lens.

Non-real time metadata is metadata for the entire clips. For example, for non-real time metadata, the following are named: a conversion table in which LTC corresponding to the individual frames is associated with frame numbers (FTC), information about UMID and GPS, or the other items of information. Moreover, the term frame is a unit of image data, which is image data corresponding to a singe screen of images (or various items of data corresponding to the image data). A single clip of image data is generally configured of a plurality of frames of image data.

The real time metadata and non-real time metadata described above may be attached to any units of image data. Hereinafter, the case will be described in which real time metadata is attached to image data at every frame, and non-real time metadata is attached to image data for every clip.

In other words, in the discussion below, real time metadata is frame metadata attached to image data at every frame, and includes data corresponding to the attached frame. In addition, non-real time metadata is clip metadata attached to image data for every clip, and includes data corresponding to the entire attached clips. Generally, image data is formed into a file for every clip, and is managed by a file system. In this case, non-real time metadata can be metadata for every file including image data.

As shown in FIG. 5, for example, in the clip section 34, items of data of the individual clips are in turn recorded as a clip 34A, a clip 34B, and so on. The area in which clips in the clip section 34 are not recorded yet is a blank section 34C. Moreover, the clip 34A is configured of a body A including image data and audio data belonging to the clip 34A, footer information F_A, and header information H_A. Similarly, the clip 34B is configured of a body B including image data and audio data belonging to the clip 34B, footer information F_B, and header information H_B. In addition, a clip of data is simply called a clip below.

Figure 6:
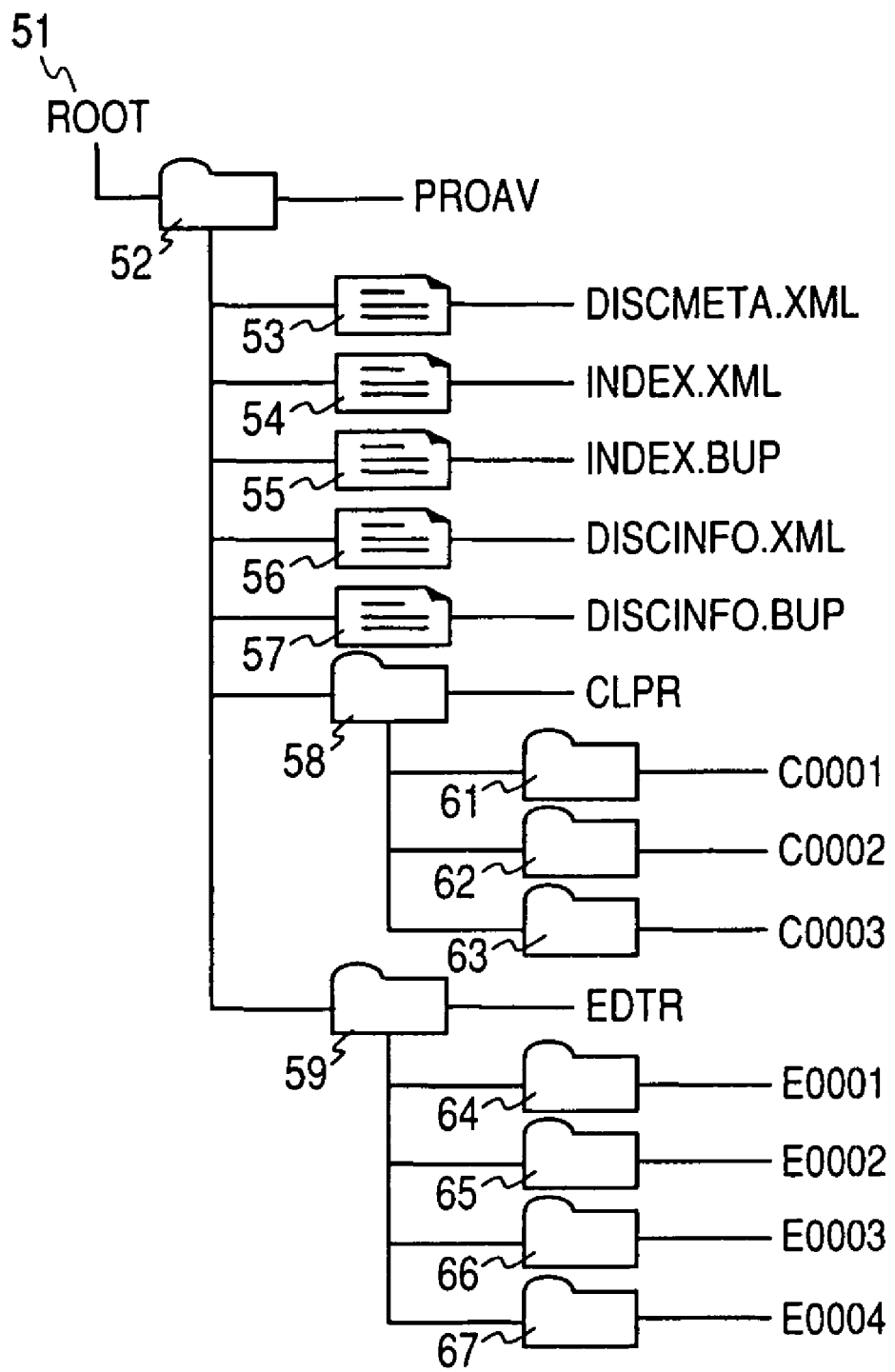
FIG. 6 shows a schematic diagram depicting an exemplary directory structure of files recorded on an optical disk.

In the optical disk 130A, management information in the file system sections 32A and 32B manages each item of data as files, as shown in FIG. 6. For the file system that manages data recorded on the optical disk 130A, any systems may be used. For example, UDF (Universal Disk Format) and ISO 9660 (International Organization for Standardization 9660) may be used. In addition, a file system exclusive for use may be used.

In the file system, data recorded on the optical disk 130A is managed by a directory structure and files as shown in FIG. 6. In FIG. 6, a route directory (ROOT) 51 is provided with a PROAV directory 52 having low directories of information about material data such as image data and audio data and edit lists indicating the edited result of material data. Moreover, although not shown in the drawing, the route directory 51 is also provided with table data.

The PROAV directory 52 is provided with a disk metafile (DISCMETA.XML) 53, an index file (INDEX.XML) 54 that includes management information for all the clips and edit lists recorded on the optical disk 130A, a copy index file (INDEX.BUP) 55, a disk information file (DISCINFO.XML) 56, a copy disk information file (DISKINFO.BUP) 57, a clip route directory (CLPR) 58 that has clips in low directories, and an edit list route directory (EDTR) 59 that has items of data of edit lists in low directories.

In the disk metafile 53, disk information is described that a user has to know, such as a disk title.

The index file 54 is a file that manages information about files recorded on the optical disk 130A, and clips stored below the clip route directory are described as a clip table. In the clip table, a clip to be managed is specified by using UMID. Furthermore, each item of data configuring the clip is also specified by each UMID. In addition, the index file similarly manages edit lists, and specifies the edit lists by using UMID.

In the disk information file 56, attribute information for the entire disk is described that is necessary when the optical disk 130A is mounted. In the embodiment, the disk information file 56 includes LTC information about the last frame which is end time code information about the last item of material data among the items of material data (clip data) configuring the data frame of a predetermined content recorded on the optical disk 130A. Moreover, the disk information file 56 is described in the XML format.

In the clip route directory 58, clips of data recorded on the optical disk 130A are managed as categorized into different directories for every clip. For example, in the case shown in FIG. 6, three clips are categorized into three directories, a clip directory (C0001) 61, a clip directory (C0002) 62, and a clip directory (C0003) 63 for management.

In other words, each item of data of the clip recorded on the optical disk 130A at the first time is managed as a lower file of the clip directory 61, each item of data of a clip recorded on the optical disk 130A at the second time is managed as a directory file of the clip directory 62, and each item of data of a clip recorded on the optical disk 130A at the third time is managed as a lower file of the clip directory 63.

In addition, in the edit list route directory 59, edit lists recorded on the optical disk 130A are managed as categorized into four directories different in every edit process. For example, in the case shown in FIG. 6, four edit lists are categorized into four directories, an edit list directory (E0001) 64, an edit list directory (E0002) 65, an edit list directory (E0003) 66, and an edit list directory (E0004) 67 for management.

In other words, the edit list indicating the edited result of a clip recorded on the optical disk 130A at the first time is managed as a lower file of the edit list directory 64, the edit list indicating the edited result recorded at the second time is managed as a lower file of the edit list directory 65, the edit list indicating the edited result recorded at the third time is managed as a lower file of the edit list directory 66, and the edit list indicating the edited result recorded at the fourth time is managed as a lower file of the edit list directory 67.

The operation of the optical disk apparatus 100 shown in FIG. 4 will be described briefly.

First, an exemplary recording operation will be described. Material data and metadata inputted from the input part 115 are supplied to the record signal processing part 116. The record signal processing part 116 converts the format of the material data and metadata supplied from the input part 115 from the transmission format into the recording format, for example. The material data and metadata subjected to signal processing are supplied to the information processing part 117. In addition, material data and metadata acquired in the network interface 118 are supplied to the information processing part 117.

The material data and metadata supplied from the record signal processing part 116 or from the network interface 118 and supplied to the information processing part 117 are processed as necessary, supplied to the drive control part 120, and then written to the optical disk 130A by the pickup part 121.

Next, an exemplary reproduction operation will be described. Material data and metadata read out of the optical disk 130A in the pickup part 121 are supplied to the information processing part 117 through the drive control part 120. Then, for example, material data and metadata to be supplied to the information processing part 117 are supplied to another device through the network interface 118. In addition, material data and metadata to be supplied to the information processing part 117 are fed to the reproduction signal processing part 123. The reproduction signal processing part 123 converts the format of the material data and metadata supplied from the information processing part 117 from the recording format to the transmission format, for example. The material data and metadata subjected to signal processing are externally outputted from the output part 124.

Next, an exemplary edit operation of material data and metadata recorded on the optical disk 130A will be described. Material data and metadata of a target for editing read out of the optical disk 130A by the pickup part 121 are supplied to the information processing part 117 through the drive control part 120. The information processing part 117 and the metadata processing part 119 edit the read material data and metadata. Then, the edited material data and metadata are supplied to the drive control part 120, and written to the optical disk 130A by the pickup part 121.

Figure 7:
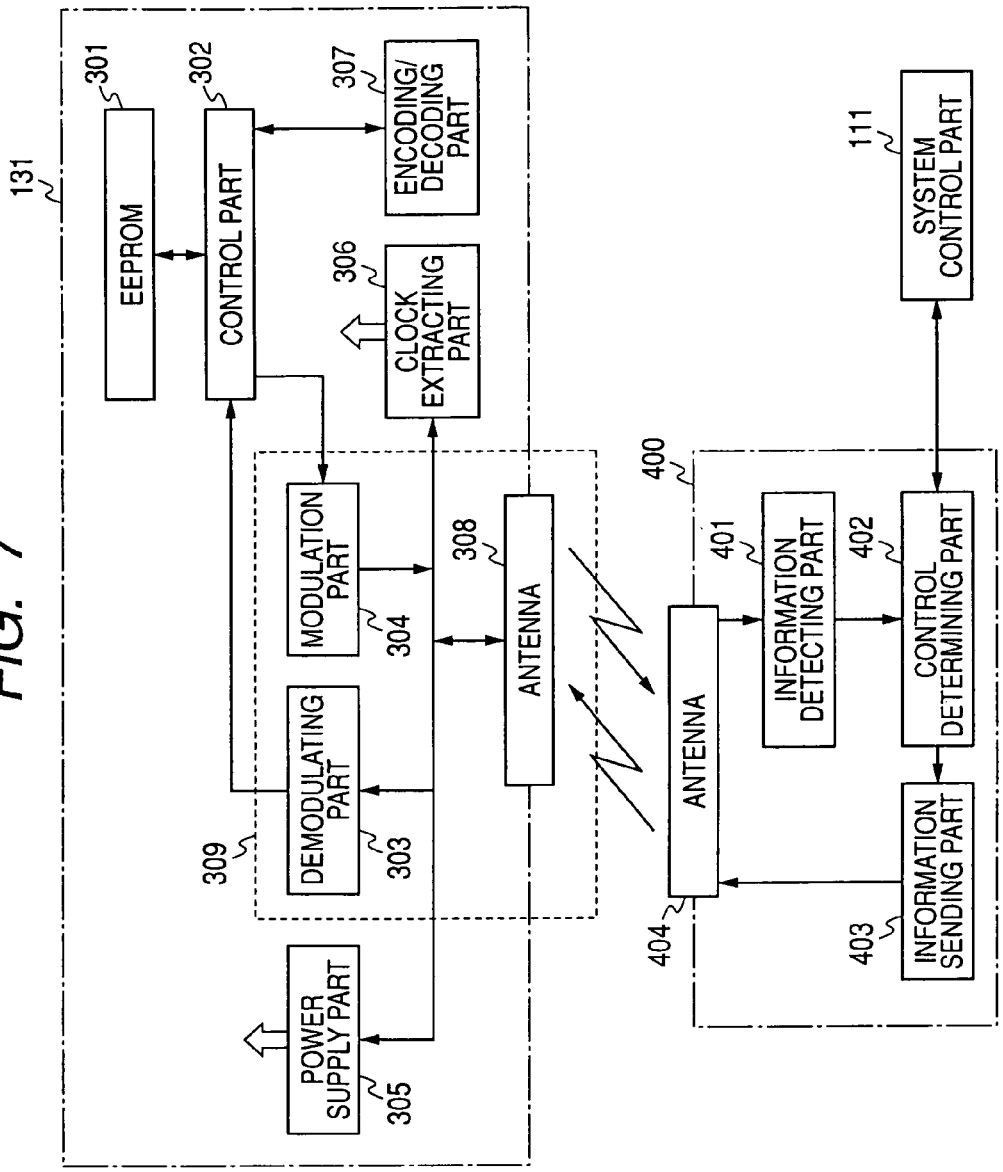
FIG. 7 shows a block diagram depicting an exemplary configuration of a reader/writer and a memory tag.

FIG. 7 shows exemplary configurations of the reader/writer 400 and the memory tag 131. The memory tag 131 is a noncontact memory tag. The memory tag 131 operates in response to an electromagnetic field when the relative distance to the reader/writer 400, which is a device forming the electromagnetic field therearound, is within the limit distance responsive to the electromagnetic field, and then the memory tag 131 exchanges information with the reader/writer 400 in a noncontact manner.

Here, prior to the discussion of the memory tag 131 in detail, the appearance of the main part of the memory tag 131 and the operation in using the memory tag 131 with the reader/writer 400 will be described briefly.

Figure 8:
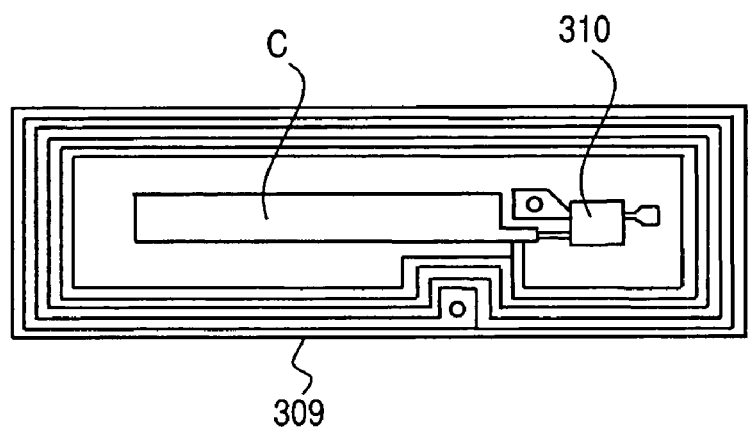
FIG. 8 shows a diagram depicting the appearance of a noncontact memory tag implemented by one chip.

FIG. 8 shows the appearance of the memory tag 131 implemented in the one-chip configuration. As shown in FIG. 8, the memory tag 131 includes a coil antenna 308 having a conductive pattern formed in a loop shape on a base chip, in which an IC chip 310 and a capacitor C are connected to the coil antenna 308. Moreover, the capacitor C adjusts resonance frequencies.

The memory tag 131 has the coil antenna 308 that is inductively coupled to the coil antenna 404 of the reader/writer 400 with an electromagnetic field as a medium and receives and sends information by mutual induction in a noncontact manner and receives electric power, a sending and receiving part 309 that has a demodulating part 303 and a modulation part 304 both of them connected to the coil antenna 308, a power supply part 305 and a clock extracting part 306, both of them connected to the coil antenna 308, a control part 302 that controls the overall operation, an encoding/decoding part 307 that is connected to the control part 302, and a rewritable semiconductor memory (EEPROM: Electronically Erasable and Programmable Read Only Memory) 301 that is connected to the control part 302 with no need of memory operation.

The demodulating part 303 equalizes, detects and demodulates induced current generated in the coil antenna 308 to restore information, and supplies the information to the control part 302. In addition, the modulation part 304 has any one of the configurations in which the reflected wave is modulated by intermittently connecting load impedance to the coil antenna 308 based on response information that reproduction information supplied from the control part 302 is encoded, in which the load directly or indirectly connected to the power supply part 305 is intermittently connected to the coil antenna 308 based on response information, and in which the power of the carrier wave of another frequency modulated with response information (for example, ASK modulation) is fed to the coil antenna 308.

In the configuration in which the load impedance of the coil antenna 308 is controlled based on response information, in emitting the reflected wave of the carrier wave from the coil antenna 308 that continuously receives the effect of the electromagnetic field from the reader/writer 400, the load impedance is switched to control the reflectance of the coil antenna 308 based on response information, whereby the reflected wave is modulated with the response information described above.

In addition, in the configuration in which the load of the power source is controlled based on response information, the load is switched based on response information to vary the load applied to the power supply part 305 to change the impedance on the memory tag 131 side in the inductively coupled state for modulation. The impedance change on the memory tag 131 side is detected as a change in the terminal voltage of the coil antenna 404, or a change in the amount of the inputted power on the reader/writer 400 side in the inductively coupled state.

The power supply part 305 rectifies the high frequency induced current generated by the coil antenna 308 through the electromagnetic field by mutual induction to acquire a direct current voltage, and supplies power to the individual parts. Moreover, the power supply part 305 may have a voltage stabilization circuit that outputs a stable direct current voltage. Since the individual parts of the memory tag 131 operate with the power supply fed from the power supply part 305, it is unnecessary to prepare the other power sources such as a battery in the memory tag 131 particularly. However, such a configuration may be possible in which the other power sources such as a battery is a primary power source or a secondary power source.

The clock extracting part 306 has a divider circuit, which outputs the clock signal of the carrier frequency based on the carrier wave received in the coil antenna 308 as well as divides the clock signal to generate the master clock to be the operation reference clock of each of the digital circuits for output.

As described above, the semiconductor memory 301 is a memory that records the following information: general information (such as a disk title, a disk ID, a creation date, and a remaining time) for identifying the disk cartridge 130, information about contents recorded in the disk cartridge 130 (such as a title, a record date, a thumbnail image, and audio data), information whether the disk cartridge 130 can be handled and operated in the optical disk apparatus 100, that is, information that determines compatibility (for example, information indicating the disk type such as a single-layer disk, a dual-layer disk, a Blu-ray disk and a disk cartridge, and information about the recording format such as SD formats and HD formats), and information for controlling the handling and operation of the disk cartridge 130 mounted on the optical disk apparatus 100 (for example, information about the time code (end time code) indicating the end position of reproduced data, and edit lists). The recording and reproduction of each item of information with respect to the semiconductor memory 301 are conducted under the control done by the control part 302.

In receiving information, the control part 302 sends the modulated signal given from the sending and receiving part 309 to the encoding/decoding part 307. The encoding/decoding part 307 decodes the information supplied from the control part 302 and corrects errors in the information based on CRC coding, for example, and returns the information to the control part 302. The control part 302 extracts instruction information from the information. As discussed above, the information is restored that is given through the electromagnetic field from the reader/writer 400.

In addition, in reply, the encoding/decoding part 307 encodes information supplied from the control part 302 with error correction code such as CRC coding, and returns the encoded response information to the control part 302. The encoding/decoding part 307 has a function of error correction of data, and the encoding/decoding part 307 may be configured to have a function of encoding/decoding data in addition thereto.

The control part 302 is configured as a semiconductor logic control circuit having a sequence control function in which the control part 302 sends the demodulated signal supplied from the demodulating part 303 to the encoding/decoding part 307 based on the clocks supplied from the clock extracting part 306 to extract various items of information on the basis of the error corrected signal, or the control part 302 separates and extracts information for recording, and analyzes items of instruction information to execute a predetermined process by a predetermined procedure. Such a technique of semiconductor sequence controllers is widely applied in which conditions are determined in accordance with a predetermined procedure like this to in turn execute the opening and closing of a plurality of gates, for example, in a time series. The control part 302 uses this technique.

On the other hand, the modulation part 304 that has received information through the control part 302 performs the modulation process based on a predetermined modulation mode. In response to this, the sending and receiving part 309 sends the modulated signal to the reader/writer 400 through the coil antenna 308. As described above, this transmission is done based on the principle in accordance with the transmission wave by the transmission function owned by the memory tag 131, or in accordance with the reflected wave, or in accordance with a change in the impedance.

Figure 9:
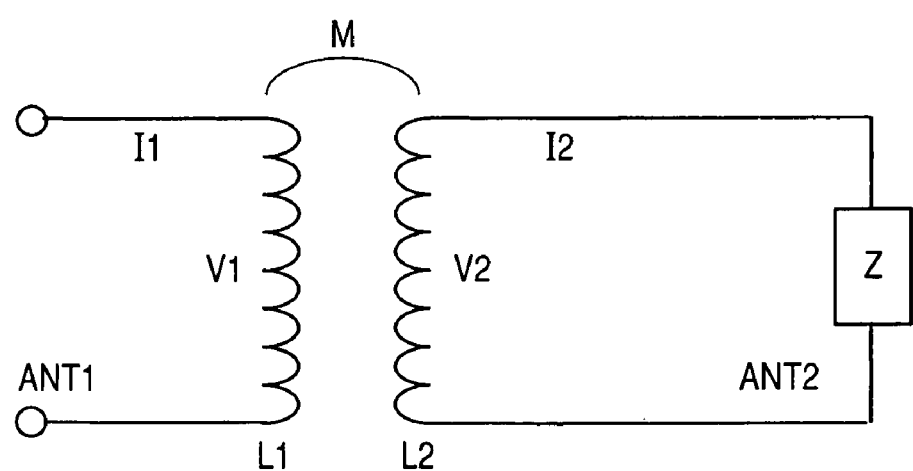
FIG. 9 shows a circuit diagram illustrative of an inductively coupled four terminal network.
Figure 10:
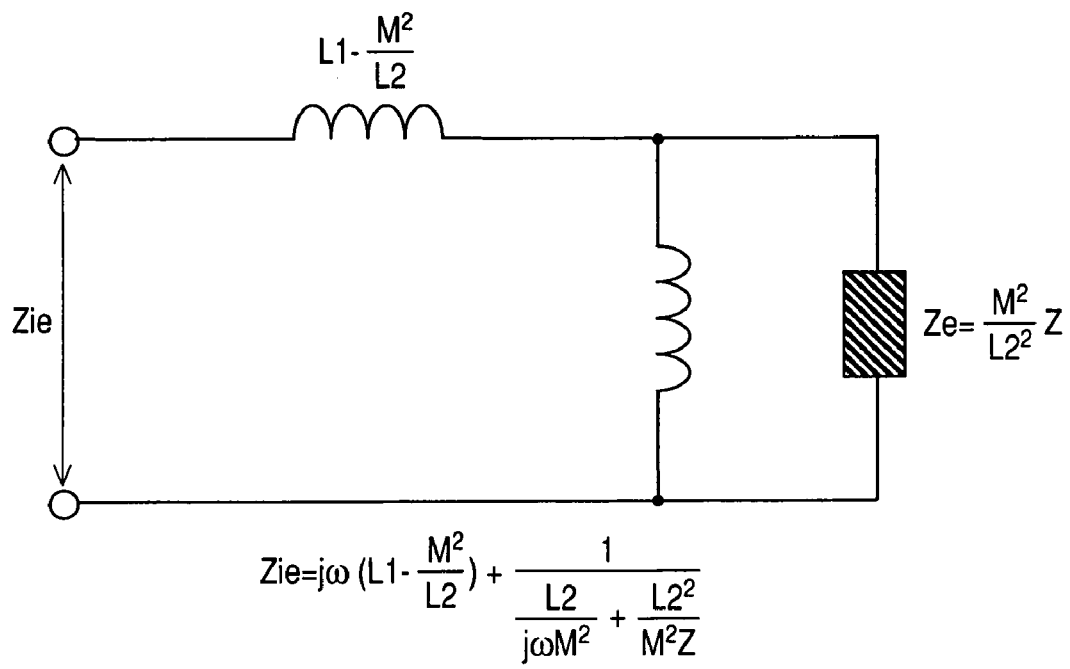
FIG. 10 shows a circuit diagram depicting an equivalent circuit of the inductively coupled four terminal network.

Next, the principle of detecting the descriptions of the semiconductor memory 301 in the memory tag 131 by the reader/writer 400 will be described with reference to FIGS. 9 and 10.

Suppose the coil antenna 404 of the reader/writer 400 is a first antenna, and the coil antenna 308 of the memory tag 131 is a second antenna. When the first antenna faces the second antenna and a magnetic field generated by the current carried through the first antenna is caught by the second antenna, the magnetic field generated by the current is changed correspondingly to the change in the current carried through the first antenna. Thus, a change occurs in the magnetic flux penetrating through the second antenna, and an electromotive force is generated in the second antenna by mutual induction. An electromotive force V2 generated in the second antenna is proportional to the change in a current I1 of the first antenna, and is expressed by Equation (1) conditional to the tuning condition where M is a mutual inductance. A current I2 carried through the second antenna depends on the characteristics of a circuit connected thereto.

$$V2 = M(dI1/dt) \quad (1)$$

On the other hand, to the coil antenna (the second antenna) 308 of the memory tag 131, a resistance or reactance (the inductive reactance $\omega L$ or the capacitive reactance $1/\omega C$) as a load impedance can be connected, and the intermittent connection of the load impedance to the second antenna is controlled by the description of data ("1" or "0") sent from the memory tag 131.

As discussed above, suppose the reader/writer 400 is a primary side and the memory tag 131 inductively coupled to the reader/writer 400 by mutual induction is a secondary side. The reader/writer 400 and the memory tag 131 can be treated as an inductively coupled four terminal network shown in FIG. 9, where the total impedance on the secondary side is Z. Here, the impedance Zie measured on the primary side is computed as follows.

The inductive electromotive force V1 conditional to the tuning condition is expressed by Equation (2), and the inductive electromotive force V2 is expressed by Equation (3), where ω is the angular frequency, the inductance of the coil antenna 404 of the reader/writer 400 is L1, the electromotive force is V1, the current is I1, the inductance of the coil antenna 308 of the memory tag 131 is L2, the electromotive force is V2, the current is I2, and the mutual inductance of the coil antenna 404 and the coil antenna 308 is M.

$$V1 = j\omega * L1 * I1 + j\omega * M * I2 \quad (2)$$

$$V2 = j\omega * M * I1 + j\omega * L2 * I2 \quad (3)$$

Here, since the direction of the current I2 is reversed, Equation (4) is held:

$$V2 = -Z * I2 \quad (4)$$

From the discussion above, the impedance Zie on the reader/writer 400 side is the sum of the first term $j\omega*(L1-M**2/L2)$ and the second term $j\omega*(M**2)*Z/L2*(Z+j\omega)*L2)$, where the symbol "**" is square.

Here, the second term described above is $1/(u2+u3)$, where the definitions are made as Equations (5) and (6):

$$u2 = L2/j\omega*(M**2) \quad (5)$$

$$u3 = (L2**2)/Z*(M**2) \quad (6)$$

Therefore, the impedance Zie on the reader/writer 400 side is Equation (7), where the first term described above is u1. Consequently, the equivalent circuit of the inductively coupled four terminal network can be the circuit as shown in FIG. 10.

$$Zie = u1 + 1/(u2+u3) \quad (7)$$

In the case in which the circuit is controlled so that the impedance Z on the memory tag 131 side is infinite impedance depending on the description of data to transmit (any one of "1" and "0", for example, "1"), the term of Equation (8) is infinitesimal. Thus, the state in which data is "1" is observed as the impedance of Equation (9) on the reader/writer 400 side.

$$u3 = (L2**2)/Z*(M**2) \quad (8)$$

$$Zie1 = j\omega * L1 \quad (9)$$

On the other hand, in the case in which the impedance Z on the memory tag 131 side is zero impedance depending on the description of data (any one of "1" and "0", for example, "0"), the term $1/(u2+u3)$ is infinitesimal. Thus, the state in which data is "0" is observed as the impedance of Equation (10) on the reader/writer 400 side.

$$Zie0 = j\omega*(L1-M**2/L2) \quad (10)$$

This is expressed as Equation (12), where the coupling constant k of the coil antenna 404 and the coil antenna 308 in Equation (11) is used.

$$k2 = M2/L1*L2 \quad (11)$$

$$Zie0 = j\omega * L1 * (1-k**2) \quad (12)$$

As described above, the state in which data is "1" or "0" on the memory tag 131 side can be easily detected on the reader/writer 400 side, as the states are observed as different impedance values Zie1 and Zie0.

Furthermore, it is configured in which the impedance Z on the memory tag 131 side is switched to different given values from zero to the infinite, whereby the impedance Z can be observed as the different impedance values Zie corresponding to each value. As described above, since the impedance Zie on the primary side (the reader/writer side) is changed depending on the load Z on the secondary side (the memory tag side) by mutual induction, a change in the impedance Zie on the primary side is detected to find the state (data) on the memory tag 131 side.

Next, the reader/writer 400 has functions as an information sending part 403, the coil antennas 404, an information detecting part 401, and a control determining part 402, which operates in the transmission mode and the reception mode with the memory tag 131. In the transmission mode, the reader/writer 400 supplies information to be recorded on the memory tag 131 to the memory tag 131, whereas in the reception mode, the reader/writer 400 is supplied with reproduced information from the memory tag 131.

The information sending part 403 has a clock generating function, a modulating function, and an electric power amplifying function, which generates clock signals of the carrier frequency and master clocks. In the transmission mode, for example, the information sending part 403 applies ASK modulation to the carrier wave to be modulated signals based on transmission data supplied from the control determining part 402, and amplifies the signals to drive the antenna 404. In addition, in the reception mode, the information sending part 403 amplifies the carrier wave with no modulation to drive the antenna 404.

The antenna 404 is configured of an antenna in a loop also serving for transmission and reception, which forms an electromagnetic field based on the modulated signal in the transmission mode, whereas which forms an electromagnetic field based on the carrier wave in the reception mode. In any modes, the reader/writer 400 is inductively coupled to the coil antenna 308 of the memory tag 131 through an electromagnetic field. The information detecting part 401 has an antenna terminal voltage detecting function and a demodulating function. Moreover, the control determining part 402 has an encoding/decoding function, a control function of the overall operation of the configuration, and an interface function to the system control part 111 described above.

In the transmission mode, the control determining part 112 organizes transmission information to be fed to the memory tag 131 side based on the signal received from the system control part 111. The information sending part 403 modulates the carrier wave based on the transmission information, and amplifies the carrier wave to drive the antenna 404. Thus, an electromagnetic field is formed that is configured of the carrier wave having the transmission information thereon, and the electromagnetic field supplies the transmission information as well as electric power to the memory tag 131. The transmission information is configured of an instruction to reproduce and send the recorded information from the memory tag 131, or is configured of an instruction to record data that is supplied to the memory tag 131 and the data.

Even in the reception mode, the information sending part 403 continuously generates electromagnetic fields configured of the unmodulated carrier wave having no information thereon. With these electromagnetic fields, electric power is continuously supplied to the memory tag 131 as well as a response from the memory tag 131 is detected. The response has thereon reproduction information read out of the memory tag 131.

Here, the memory tag 131 changes the load of the antenna 308 of the memory tag 131 in accordance with the descriptions of the response, or the memory tag 131 changes the electric power load of the memory tag 131 side, and then the terminal voltage of the antenna 404 is varied in accordance with the change in the load on the memory tag 131 side, because the antenna 404 is inductively coupled to the antenna 308 of the memory tag 131. The information detecting part 401 detects and demodulates the change in the terminal voltage, and passes the change to the control determining part 402. The control determining part 402 applies error correction to the change to restore the response, and sends it to the system control part 111.

As described above, in the transmission mode, the reader/writer 400 sends the command having transmission information thereon to write the information to the memory tag 131. In addition, in the reception mode, the reader/writer 400 sends the reproduction command to read information out of the memory tag 131.

Next, an exemplary process done by the system control part 111 will be described in the case in which information on the recorded disk cartridge 130 is reproduced in the optical disk apparatus 100 shown in FIG. 1 with reference to a flow chart shown in FIG. 11.

The optical disk apparatus 100 starts the process in Step ST21, and after that, the optical disk apparatus 100 goes to Step ST22. In Step ST22, the optical disk apparatus 100 acquires information from the memory tag 131 on the disk cartridge 130 brought close to the insertion port 101.

Then, in Step ST23, the optical disk apparatus 100 determines whether the disk cartridge 130 can be handled and operated, that is, the optical disk apparatus 100 determines whether compatibility is matched, based on information for determining compatibility (for example, information indicating the disk type such as a single-layer disk, a dual-layer disk, a Blu-ray disk and a disk cartridge, and information about the recording format such as SD formats and HD formats) in the information acquired in Step ST22.

If the optical disk apparatus 100 determines that it is difficult to handle and operate the disk cartridge 130, that is, the optical disk apparatus 100 determines that the compatibility is not matched, and then the optical disk apparatus 100 goes to Step ST24. In Step ST24, the optical disk apparatus 100 shows error on the display part 102 (the compatibility is not matched), and after that, in Step ST25, the apparatus ends the process. Moreover, when the optical disk apparatus 100 determines that the compatibility is not matched as described above, the optical disk apparatus 100 does not load the disk cartridge 130 even though an operator inserts the disk cartridge 130 into the insertion port 211.

In addition, if the optical disk apparatus 100 determines that the disk cartridge 130 can be handled and operated in Step ST23, that is, the optical disk apparatus 100 determines that the compatibility is matched, the optical disk apparatus 100 goes to Step ST26. In Step ST26, the optical disk apparatus 100 shows on the display part 102 that the compatibility is matched (see FIG. 3). With this representation, the operator can confirm that the disk cartridge 130 can be handled and operated in the optical disk apparatus 100, and then the operator inserts the disk cartridge 130 into the insertion port 101.

Subsequently, the optical disk apparatus 100 loads the disk cartridge 130 inserted into the insertion port 101 to mount the disk cartridge 130 on the recording medium mounting part 103. Then, in Step ST28, the optical disk apparatus 100 rotates the optical disk 130A to read management information, and after that, in Step ST29, the optical disk apparatus 100 controls the pickup position, for example, for standby as the end time code is targeted, based on information about the time code (end time code) of the end position of reproduced data in the information acquired from the memory tag 131 on the disk cartridge 130 in Step ST22.

Moreover, the optical disk apparatus 100 in turn parses management information read out of the optical disk 130A at Step ST28. In other words, the optical disk apparatus 100 performs the process in Step ST29 before the management information described above is parsed, and also performs the reproduction process, described later, without waiting for the completion of parsing management information.

Subsequently, in Step ST30, the operator turns on the play button, and then the optical disk apparatus 100 goes to Step ST31. In Step ST31, the optical disk apparatus 100 reproduces data from the end time code described above. Then, the operator turns on the stop button in Step ST32, and the operator turns on the eject button in Step ST33, and after that, the optical disk apparatus 100 goes to Step ST34.

In Step ST34, the optical disk apparatus 100 rewrites management information with the updated end time code to the optical disk 130A, in Step ST35, the optical disk apparatus 100 unloads the disk cartridge 130, and after that, in Step ST25, the optical disk apparatus 100 ends the process.

Next, the state of recording information in the memory tag 131 will be further described. As described above, the memory tag 131 is recorded with general information for identifying the disk cartridge 130 (such as a disk title, a disk ID, a creation date, and a remaining time), information about contents recorded in the disk cartridge 130 (such as a title, a record date, a thumbnail image, and audio data), information whether the disk cartridge 130 can be handled and operated in the optical disk apparatus 100, that is, information that determines compatibility (for example, information indicating the disk type such as a single-layer disk, a dual-layer disk, a Blu-ray disk and a disk cartridge, and information about the recording format such as SD formats and HD formats), and information for controlling the handling and operation of the disk cartridge 130 mounted on the optical disk apparatus 100 (for example, information about the time code (end time code) indicating the end position of reproduced data, and edit lists).

The memory tag 131 is recorded with information formed in a hierarchy for each item of information for use at each of operation levels as corresponding to a plurality of operation levels in the optical disk apparatus 100. For example, general information for identifying the disk cartridge 130 described above (such as a disk title, a disk ID, a creation date, and a remaining time) and information about contents recorded in the disk cartridge 130 (such as a title, a record date, a thumbnail image, and audio data) are recorded as information of "operation level 1". In addition, for example, information for determining the compatibility of the disk cartridge 130 described above, and information for controlling the handling and operation of the disk cartridge 130 mounted on the optical disk apparatus 100 are recorded as information of "operation level 2".

Figure 12:
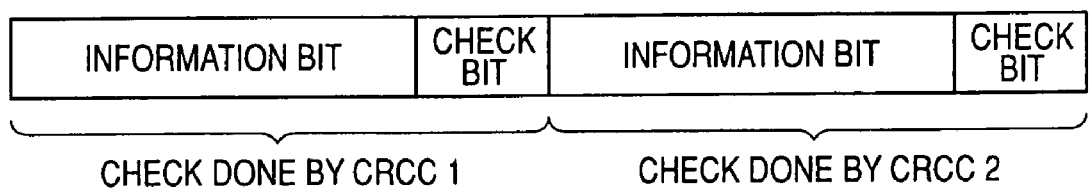
FIG. 12 shows a diagram depicting an exemplary data stream transmitted from a memory tag.

As described above, when each item of information formed in a hierarchy in the memory tag 131 is read in the optical disk apparatus 100, the memory tag 131 sends information in each of the hierarchies in the state in which the information is encoded in accordance with the CRCC (Cyclic Redundancy Check Code) in one to one correspondence to a plurality of the operation levels described above. For example, as discussed above, in the case in which the memory tag 131 stores therein items of information of the operation levels 1 and 2, as shown in FIG. 12, such information is sent in which information (the information bits) of the operation level 1 is attached with check bits that are encoded by CRCC 1, whereas information (the information bits) of the operation level 2 is attached with check bits that are encoded by CRCC 2.

In the case in which the memory tag 131 sends encoded information in each of the hierarchies as described above, the optical disk apparatus 100 applies error detection to each of the hierarchies, and the optical disk apparatus 100 determines that information in a hierarchy with no error is valid, and considers that the operation at the level corresponding to that hierarchy is permitted in which the information in the hierarchy is used. For example, in the optical disk apparatus 100, the error detection and the determination of permission like this are performed in the control determining part 402 of the reader/writer 400. Then, the reader/writer 400 sends the valid information in the hierarchy and information about the permitted operation to the system control part 111. The system control part 111 can execute the operation at the permitted operation level by using the information in the hierarchy corresponding thereto.

Figure 13:
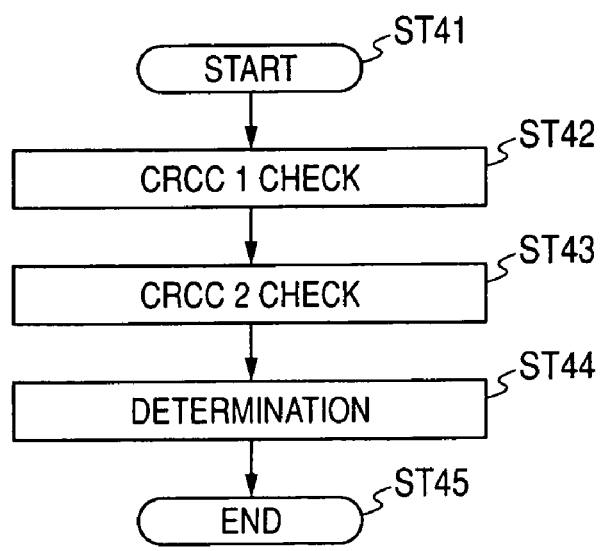
FIG. 13 shows a flow chart depicting the process steps of detecting errors and determining permission done in a control determining part of the reader/writer.
Figure 16A:
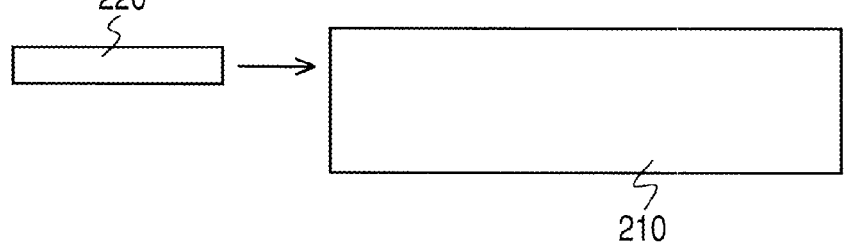
FIGS. 16A to 16C show a diagram illustrative of a disk cartridge being loaded and unloaded when compatibility is not matched.
Figure 16B:
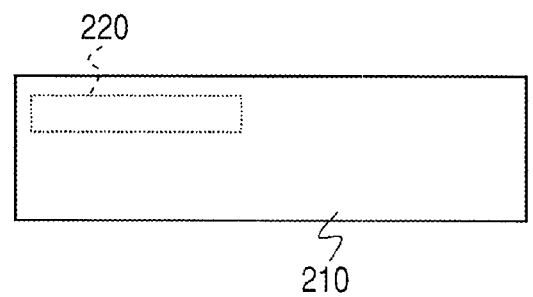
Figure 16C:
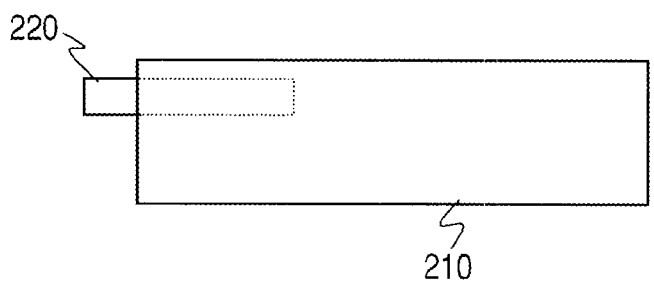

A flow chart shown in FIG. 13 depicts the process steps of error detection and determination of permission in the control determining part 402 of the reader/writer 400. In the case in which the memory tag 131 sends information, the control determining part 402 performs the process of error detection and determination of permission. The example shown in FIG. 13 is an example in which items of information of the operation levels 1 and 2 are recorded in the memory tag 131 and the items of information of the levels 1 and 2 are sent to the reader/writer 400 (see FIG. 12).

First, in Step ST41, the control determining part 402 starts the process, and after that, the control determining part 402 goes to Step ST42. In Step ST42, the control determining part 402 checks each data stream (configured of information bits and check bits) sent from the memory tag 131 by using a generating polynomial corresponding to the CRCC 1. The information bits in the data stream with no error detected by the check are valid information in the hierarchy corresponding to the operation level 1.

Subsequently, in Step ST43, the control determining part 402 checks each data stream (configured of information bits and check bits) sent from the memory tag 131 by using a generating polynomial corresponding to the CRCC 2. The information bits in the data stream with no error detected by the check are valid information in the hierarchy corresponding to the operation level 2.

Subsequently, in Step ST44, the control determining part 402 determines whether to permit the operation levels 1 and 2, and after that, in Step ST45, the control determining part 402 ends the process.

In the determination in Step ST44, the control determining part 402 determines that the operation of the operation level 1 is permitted when there is the valid information in the hierarchy corresponding to the operation level 1 in Step ST42, whereas the control determining part 402 determines that the operation of the operation level 2 is permitted when there is the valid information in the hierarchy corresponding to the operation level 2 in Step ST43.

As described above, in the case in which there are the operation levels 1 and 2, the determined results are four types results A to D as shown in FIG. 14. In FIG. 14, the indication "circle" shows that the operation is permitted, whereas the indication "cross" shows that the operation is not permitted. The system control part 111 of the optical disk apparatus 100 performs the control operation based on the determined results.

In the case in which the determined result is the result A, since the operation level 1 is permitted, the system control part 111 can control showing on the display part 102 the descriptions of information validated by the check of the CRCC 1, that is, general information (such as a disk title, a disk ID, a creation date, and a remaining time), and information about contents recorded in the disk cartridge 130 (such as a title, a record date, a thumbnail image, and audio data).

In addition, in the case in which the determined result is the result A, since the operation level 2 is permitted, the system control part 111 can determine compatibility based on information validated by the check of the CRCC 2, that is, information for determining the compatibility of the disk cartridge 130 (for example, information indicating the disk type such as a single-layer disk, a dual-layer disk, a Blu-ray disk and a disk cartridge, and information about the recording format such as SD formats and HD formats), and can control showing the determined result on the display part 102.

Moreover, in the case in which the determined result is the result A, since the operation level 2 is permitted, the system control part 111 can control the handling and operation of the disk cartridge 130 (the reproduction operation, the edit operation) based on information validated by the check of the CRCC 2, that is, information for controlling the handling and operation of the disk cartridge 130 mounted on the optical disk apparatus 100 (for example, information about the time code (end time code) indicating the end position of reproduced data and edit lists).

Figure 11:
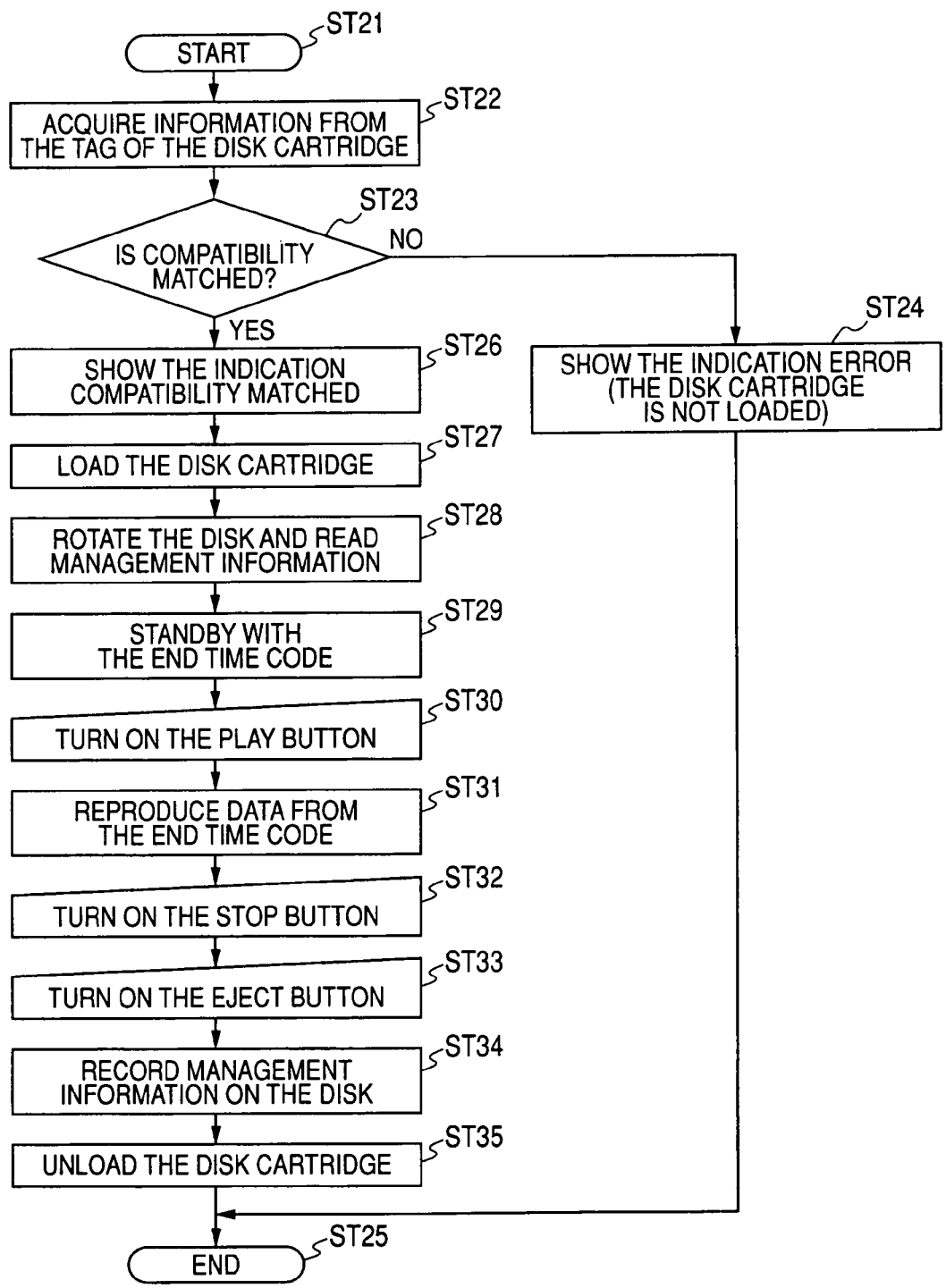
FIG. 11 shows a flow chart illustrative of an exemplary process when a recorded disk cartridge is reproduced.

Furthermore, the exemplary process shown in FIG. 11 is the example in the case in which information for determining the compatibility of the disk cartridge 130 and information for controlling the handling and operation of the disk cartridge 130 are valid. In the case in which these items of information are invalid, the process similar to the process before is performed (see FIG. 17).

In the case in which the determined result is the result B, since the operation level 1 is permitted, the system control part 111 can control showing on the display part 102 the descriptions of information validated by the check of the CRCC 1, that is, general information (such as a disk title, a disk ID, a creation date, and a remaining time), and information about contents recorded in the disk cartridge 130 (such as a title, a record date, a thumbnail image, and audio data).

In the case in which the determined result is the result C, the system control part 111 performs control of showing error on the display part 102. In this case, there is information validated by the check of the CRCC 2 and the operation level 2 is permitted, but there might be wireless communication errors, and thus control using information validated by the check of the CRCC 2 is not performed as well. Of course, for example, control of determining compatibility using information validated by the check of the CRCC 2 may be allowed.

In addition, in the case in which the determined result is the result D, since neither of the operation levels 1 and 2 are permitted, the system control part 111 performs control of showing error on the display part 102. In other words, as similar to the case in which the determined result is the result C, the system control part 111 does not perform control of using information read out of the memory tag 131.

In the optical disk apparatus 100 shown in FIG. 1, the disk cartridge 130 is brought close to the insertion port 101, and then the reader/writer 400 acquires information for determining whether the disk cartridge 130 can be handled and operated, that is, information for determining compatibility from the memory tag 131. Based on the information, the compatibility is determined, and the determined result is shown on the display part 102 and outputted in sounds. Thus, the operator can avoid waste manipulations such as mounting the disk cartridge 130 not allowed to be handled and operated in the optical disk apparatus 100 on the optical disk apparatus 100, and it can be intended to shorten manipulation time.

In addition, in the optical disk apparatus 100 shown in FIG. 1, the reader/writer 400 acquires information for controlling the handling and operation of the disk cartridge 130 mounted on the optical disk apparatus 100 from the memory tag 131 attached to the disk cartridge 130, and the handling and operation of the disk cartridge 130 (such as the reproduction operation and the edit operation) are controlled based on the information. For example, information about the time code (end time code) indicating the end position of reproduced data is acquired, the disk cartridge 130 is mounted on the recording medium mounting part 103, and then the position of the optical pickup is controlled for standby as the end time code is targeted. Therefore, a time period is shortened from the operator turning on a play button to the start of reproduction.

In addition, the memory tag 131 attached to the disk cartridge 130 is recorded with information formed in a hierarchy for each item of information for use at each of the operation levels as corresponding to a plurality of the operation levels in the optical disk apparatus 100. Then, in sending information in each of the hierarchies from the memory tag 131 to the reader/writer 400 of the optical disk apparatus 100, information in each of the hierarchies is encoded by CRCCs different from each other.

In the optical disk apparatus 100 shown in FIG. 1, errors in information for determining compatibility sent from the memory tag 131 are checked, and the operation using information for determining compatibility is permitted when the information has no errors and is valid. Thus, error information is not used for information for determination, and wrong determination can be prevented. In addition, in the optical disk apparatus 100 shown in FIG. 1, errors in information for controlling the handling and operation of the disk cartridge 130 sent from the memory tag 131 are checked, and control using the information for controlling the handling and operation is permitted when the information has no errors and is valid. Therefore, error information is not used for control information, and wrong control can be prevented.

Moreover, in the embodiment discussed above, the optical disk apparatus 100 is taken as an example in which the disk cartridge 130 (the optical disk 130A) is handled and operated as recording medium. However, the embodiment of the invention can be similarly adapted to drive apparatuses which handle and operate an optical disk, a magnetic disk, and a semiconductor memory as other recording media. Particularly, in the case of the semiconductor memory, the outer dimensions tend to be those of a multi-purpose semiconductor, which causes more difficulty of providing differences based on the shapes of holes. Therefore, as the embodiment of the invention, it is effective to determine compatibility based on information from the memory tag.

The embodiment of the invention is that information recorded in the memory tag attached to the recording medium is used to intend to shorten operator's manipulation time, for example, which can be adapted to an optical disk apparatus which handles and operates a disk cartridge having an optical disk housed therein as a recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. A drive apparatus that handles and operates a recording medium attached with a memory tag, the drive apparatus comprising:
    an insertion port through which the recording medium is insertable;
    an information readout part configured to read information out of the memory tag attached to the recording medium when the recording medium is close to the insertion port and before the recording medium is inserted through the insertion port;
    a determining part configured to determine whether the recording medium can be handled and operated based on the information read out by the information readout part; and
    an informing part configured to inform a determined result determined by the determining part,
    wherein the memory tag is recorded with information arranged in a hierarchy corresponding to a plurality of operation levels of the drive apparatus in which information identifying the recording medium and information identifying contents recorded in the recording medium are of a first operation level and information for determining whether the recording medium can be handled and operated and information for controlling handling and operation of the recording medium are of a second operation level, and the determining part determines whether the recording medium can be operated at the operation levels based on the hierarchy information, the hierarchy information being read out by the information readout part.

2. The drive apparatus according to claim 1, wherein the recording medium has information already recorded thereon, the memory tag is written with information about a recording format, and the determining part determines whether the recording medium can be handled and operated based on the information about the recording format read out by the information readout part.

3. A method of informing a possibility of handling and operating a recording medium in a drive apparatus, the method comprising:
    reading information out of a memory tag attached to the recording medium when the recording medium is brought close to an insertion port of the drive apparatus and before the recording medium is inserted through the insertion port;
    determining whether the recording medium can be handled and operated based on information read out of the memory tag; and
    informing a determined result determined in the determining step, wherein the memory tag is recorded with information arranged in a hierarchy corresponding to a plurality of operation levels of the drive apparatus in which information identifying the recording medium and information identifying contents recorded in the recording medium are of a first operation level and information for determining whether the recording medium can be handled and operated and information for controlling handling and operation of the recording medium are of a second operation level, and the determining step determines whether the recording medium can be operated at the operation levels based on the hierarchy information, the hierarchy information being read out by the reading information step.

4. A drive apparatus that handles and operates a recording medium attached with a memory tag, the drive apparatus comprising:
    an insertion port through which the recording medium is insertable;
    a recording medium mounting part on which the recording medium is mounted after the recording medium is inserted through the insertion port;

an information readout part configured to read information out of the memory tag attached to the recording medium when the recording medium is close to the insertion port and before the recording medium is inserted through the insertion port, wherein the information includes type information indicative of a type of the recording medium, recording format information indicative of a format utilized to record data stored on the recording medium, time code information indicative of an end position of reproduced data, and edit list information; and a control part configured to control the handling and operation of the recording medium mounted on the recording medium mounting part based on the information read out by the information readout part, wherein the memory tag is recorded with information formed in a hierarchy corresponding to a plurality of operation levels of the drive apparatus in which information identifying the recording medium and information identifying contents recorded in the recording medium are of a first operation level and information for determining whether the recording medium can be handled and operated and information for controlling handling and operation of the recording medium are of a second operation level, and the control part controls the operation of the recording medium at the operation levels based on the hierarchy information, the hierarchy information being read out by the information readout part.

5. The drive apparatus according to claim 4, wherein information read out by the information readout part is time code information indicating an end position of reproduced data, and the control part controls a position of reproducing data on the recording medium to a position indicated by the time code information based on the time code information.

6. A control method of handling and operating a recording medium in a drive apparatus, the method comprising:

reading information out of a memory tag attached to the recording medium when the recording medium is brought close to an insertion port of the drive apparatus and before the recording medium is inserted through the insertion port, wherein the information includes type information indicative of a type of the recording medium, recording format information indicative of a format utilized to record data stored on the recording medium, time code information indicative of an end position of reproduced data, and edit list information; and controlling the handling and operation of the recording medium based on information read out by the information reading step, wherein the memory tag is recorded with information formed in a hierarchy corresponding to a plurality of operation levels of the drive apparatus in which information identifying the recording medium and information identifying contents recorded in the recording medium are of a first operation level and information for determining whether the recording medium can be handled and operated and information for controlling handling and operation of the recording medium are of a second operation level, and the controlling step controls the operation of the recording medium at the operation levels based on the hierarchy information, the hierarchy information being read out by the reading information step.

7. A recording medium attached with a memory tag, wherein the memory tag is recorded with information formed in a hierarchy corresponding to a plurality of operation levels of a drive apparatus in which information identifying the recording medium and information identifying contents recorded in the recording medium are of a first operation level and information for determining whether the recording medium can be handled and operated and information for controlling handling and operation of the recording medium are of a second operation level, the information includes type information indicative of a type of the recording medium, recording format information indicative of a format utilized to record data stored on the recording medium, time code information indicative of an end position of reproduced data, and edit list information.

8. The recording medium according to claim 7, wherein in sending the information in each of hierarchies, the memory tag sends the information in each of the hierarchies as the information is encoded in accordance with CRCCs different from each other.

9. The drive apparatus according to claim 1, wherein one of the operation levels includes information for identifying the recording medium and information about contents recorded in the recording medium and another of the operation levels includes information for determining compatibility between the recording medium and the drive apparatus.

10. The method according to claim 3, wherein one of the operation levels includes information for identifying the recording medium and information about contents recorded in the recording medium and another of the operation levels includes information for determining compatibility between the recording medium and the drive apparatus.

11. The drive apparatus according to claim 4, wherein one of the operation levels includes information for identifying the recording medium and information about contents recorded in the recording medium and another of the operation levels includes information for determining compatibility between the recording medium and the drive apparatus.

12. The method according to claim 6, wherein one of the operation levels includes information for identifying the recording medium and information about contents recorded in the recording medium and another of the operation levels includes information for determining compatibility between the recording medium and the drive apparatus.

13. The recording medium according to claim 7, wherein one of the operation levels includes information for identifying the recording medium and information about contents recorded in the recording medium and another of the operation levels includes information for determining compatibility between the recording medium and the drive apparatus.

* * * * *